(12) United States Patent
Kundermann et al.

(10) Patent No.: US 6,454,074 B1
(45) Date of Patent: Sep. 24, 2002

(54) MULTIPLE-CLUTCH DEVICE

(75) Inventors: Wolfgang Kundermann, Schweinfurt; Jörg Sudau, Niederwerrn, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/678,444

(22) Filed: Oct. 2, 2000

(30) Foreign Application Priority Data

| Sep. 30, 1999 | (DE) | 199 46 857 |
| Nov. 17, 1999 | (DE) | 199 55 365 |
| Feb. 1, 2000 | (DE) | 100 04 186 |

(51) Int. Cl.$^7$ ............................................. F16D 21/06
(52) U.S. Cl. .............. 192/87.11; 192/48.8; 192/85 AA; 192/106 F
(58) Field of Search ........................... 192/87.11, 87.14, 192/87.15, 48.8, 48.9, 48.91, 85 AA, 106 F; 475/146

(56) References Cited

U.S. PATENT DOCUMENTS

| 4,304,410 A | | 12/1981 | Erickson et al. |
| 4,732,253 A | | 3/1988 | Hiramatsu et al. |
| 5,069,657 A | * | 12/1991 | Taniguchi et al. .... 192/87.11 X |
| 5,092,610 A | | 3/1992 | Dunham et al. |
| 5,188,575 A | | 2/1993 | Leising et al. |
| 5,232,411 A | * | 8/1993 | Hayashi et al. ............ 475/146 |
| 5,887,690 A | | 3/1999 | Haupt |
| 5,890,392 A | | 4/1999 | Ludanek et al. |

FOREIGN PATENT DOCUMENTS

| DE | 44 15 664 A1 | 11/1995 |
| DE | 196 31 983 C1 | 2/1998 |
| DE | 198 00 490 A1 | 8/1998 |
| EP | 931 951 A1 | 7/1999 |
| JP | 64-79452 A | * 3/1989 ................. 475/146 |

* cited by examiner

Primary Examiner—Richard M. Lorence
(74) Attorney, Agent, or Firm—Cohen, Pontani, Lieberman & Pavane

(57) ABSTRACT

The invention is directed to a multiple-clutch device, such as a double-clutch device, for arranging in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission. According to one aspect of the invention, it is suggested that at least one of the clutch arrangements has an actuating piston defining a pressure chamber for actuation, preferably for engagement of the clutch arrangement by means of a pressure medium, preferably a hydraulic medium, wherein the actuating piston divides the pressure chamber from an associated centrifugal force pressure compensation chamber which receives a pressure compensation medium.

25 Claims, 14 Drawing Sheets

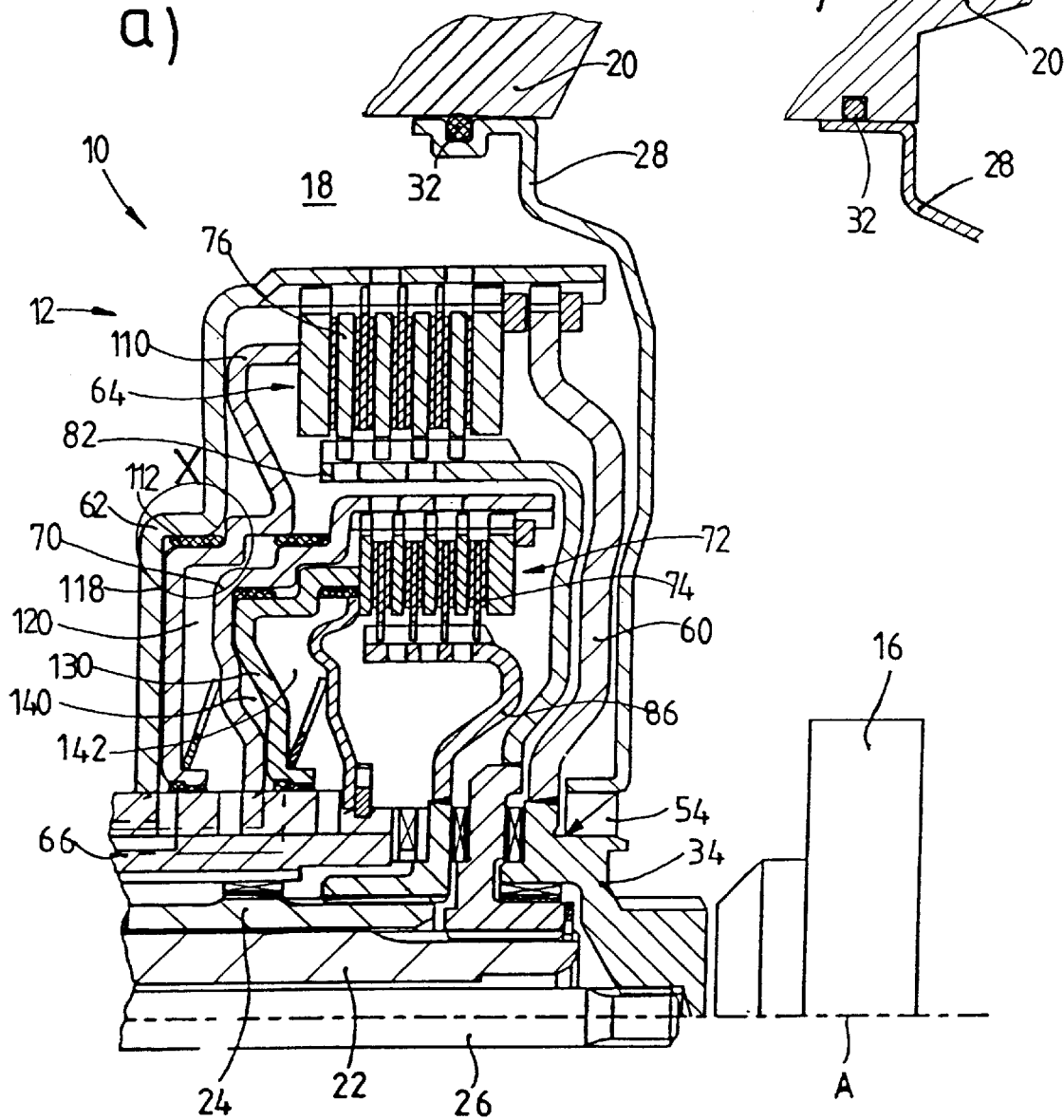
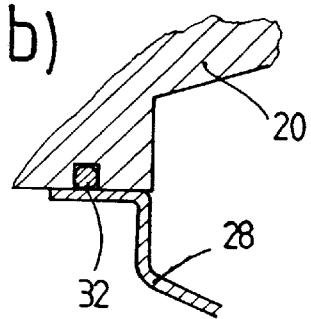
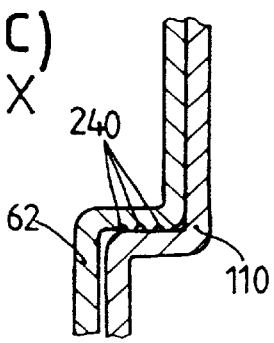
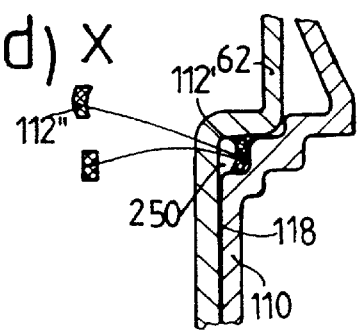
Fig. 7

MULTIPLE-CLUTCH DEVICE

BACKGROUND OF THE INVENTION

1. Field of the Invention

The invention is directed to double-clutch device, for arranging in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission.

2. Description of the Related Art

A clutch device of this type is known, for example, from EP 0 931 951 A1. The clutch device serves to connect the drive of a motor vehicle with a multiple-speed shift transmission via two friction clutches which are preferably automatically actuated, wherein a disengagement or release system is allocated to each of these two friction clutches, so that the two friction clutches can be engaged or released independently from one another. A clutch disk of one of the two friction clutches is arranged on a central transmission input shaft so as to be fixed with respect to rotation relative to it, while a clutch disk of the other friction clutch engages at a second transmission input shaft so as to be fixed with respect to rotation relative to it, this second transmission input shaft, constructed as a hollow shaft, enclosing the central transmission input shaft. The known double-clutch is arranged with a fixed thrust plate of one friction clutch at a flywheel of an internal combustion engine. To this extent, the arrangement of the double-clutch in a drivetrain substantially corresponds to the arrangement of conventional (single-)friction clutches in the drivetrain.

Double-clutch devices (called simply double-clutches) of the type mentioned above have attracted great interest recently and are generally formed of two wet or dry clutches which are switched alternately, possibly also with overlapping. Particularly in connection with a multiple-speed shift transmission, clutches of this type make it possible to carry out shifting processes between two respective transmission speeds of the transmission without interruption of tractive forces.

In principle, double-clutch devices make it possible for both clutches to be applied jointly in especially difficult starting processes, particularly those common in car racing. For this purpose, the accelerator pedal can be deflected to its stop, as the case may be, while the motor vehicle is kept essentially stationary at the same time by applying the maximum braking force until the clutch has reached its optimal transmission point. When the braking action is canceled at the moment of reaching the optimal transmission point, the vehicle is started with maximum acceleration. Starting processes of this kind are also considered for motor vehicles with a relatively weak engine under extreme starting conditions, for example, when starting on an obstruction; that is, they are not considered only for racing cars.

Obviously, starting processes of the type described above lead to high slippage with a correspondingly extensive development of heat. This presents the problem of carrying away this heat from the area of the friction clutch serving as starting clutch. Further, a correspondingly high wear of the friction clutch must be taken into account. Moreover, heating of the friction clutches is accompanied by changes in the coefficient of friction of the friction clutches, so that control of the release mechanisms of the two friction clutches, and therefore control of the two friction clutches relative to one another, can be appreciably impaired. Since inaccuracies or changes in the functional matching of the two friction clutches relative to one another caused by heat can have the result that a torque ratio not intended in the shifting process is applied to the transmission input shafts, shifting processes in the shift transmission can be subjected to load. The synchronization in the shift transmission can be overtaxed in this way, so that, in the worst case, the shift transmission can be damaged to the point of complete failure, apart from disadvantages with respect to efficiency which occur in any case. On the whole, mismatching between the two friction clutches caused by heat is incompatible with a problem-free torque transmission in shifting processes in the shift transmission without interruption of tractive force and without jerking during shifting.

Another problem area in a double-clutch device relates to starting processes carried out in opposition to an inclination, wherein the motor vehicle must be prevented from rolling backward, or those which are used when parking at the lowest possible speed, for example, for precise positioning of a motor vehicle in a parking space. The operating states mentioned above are referred to in technical circles as "hill-holding" and "creeping". Both starting processes have in common that the friction clutch serving as starting clutch is operated, sometimes without actuation of the accelerator, over a longer period of time with slip. Although the torques to be transmitted in such starting processes lie well below those occurring under the operating conditions described above, especially in car racing, an intensive heating of the respective friction clutch or even both friction clutches can occur, resulting in the problems detailed above.

Suggestions have been made for gear-shifting strategies and shifting processes for double-clutch transmissions based on the aimed for adjustment of clutch slip (DE 196 31 983 C1) with consequent generation of friction heat. Depending on driving behavior, overheating problems of the type mentioned above cannot be ruled out.

The risk of intensive overheating exists not only in a dry friction clutch, but can also occur in so-called "wet" friction clutches, in the form of a disk or plate clutch, which are operated by the action of a viscous operating medium such as hydraulic fluid. By way of example, a gear change box with two plate clutches is known from DE 198 00 490 A1, wherein one plate clutch is provided for forward driving and the other for driving in reverse. DE 198 00 490 A1 is concerned primarily with providing adequate cooling of the two plate clutches using the viscous operating medium. In spite of the liquid cooling, heating of the friction clutches is also a considerable problem in plate clutches because the operating medium, which usually flows through friction facing grooves or the like to carry off the heat, cannot be guided between the plates in optional quantity. The reason for this is that, on one hand, excessive flow through the friction facing grooves or the like would build up a counterpressure between the friction surfaces of two adjacent plates and would therefore reduce the capacity of the friction clutches to transmit torque (with a corresponding increase in slip and therefore additional generation of friction heat, so that the problem of overheating is exacerbated) and, on the other hand, the operating medium could be overheated and destroyed when flowing through between the plates. Overheating in plate clutches can result in that the friction surfaces can no longer separate from one another completely during a disengaging process and, consequently, torques can still be transmitted via the clutch which should be disengaged, so that considerable drag torques can reach the associated shift transmission. When plates clutches are used in a multiple-clutch device, especially a double-clutch device, of the type mentioned above, shifting processes could again be brought under load in the shift transmission with resulting overtaxing of the synchronization in the shift transmission.

One approach to mastering overheating problems in the area of friction clutches in case of unfavorable operating conditions, for example, with problematic starting processes in a motor vehicle, is to provide another starting element in addition to the first and second clutch arrangements which is in the form of a hydraulic clutch or hydrodynamic clutch and comprises a hydrodynamic circuit with an impeller wheel, a turbine wheel and, if desired, a stator wheel. The driving member can be connected in parallel with one of the two friction clutches; that is, it can act on a common transmission input shaft irrespective of the engagement state of this friction clutch. A clutch device in which two plate clutches and a starting element of this type are integrated, was described in the German Patent Application 199 46 857.5 by the present Applicant which was applied for on Sep. 30, 1999 and whose disclosure is incorporated in the subject matter disclosed in the present application.

Within the framework of investigations undertaken by the present Applicants in connection with double-clutch devices, it was shown in general that wet-type clutches exhibit sealing problems and problems relating to output losses. Further, it was shown that boundary conditions relating to the available axial and radial installation space could be adhered to only with difficulty, if at all, based on the previously known concepts. With regard to clutches, possibly, diaphragm clutches, which are actuated by pistons integrated in the clutch device, the arrangement of the piston chambers associated with the pistons proved especially problematic.

SUMMARY OF THE INVENTION

The object of the invention is generally to achieve improvements with respect to at least one of the problems and/or other problems mentioned above. In particular, an objective of the invention is to provide a multiple-clutch device with advantageous operating performance, for example, with respect to operating reliability, and/or a multiple-clutch device which can be constructed in a compact manner.

According to a first aspect, the invention provides a multiple-clutch device, i.e., a double-clutch device, for arranging in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission. According to this first aspect of the invention, at least one of the clutch arrangements has an actuating piston defining a pressure chamber for actuation, preferably for engagement of the clutch arrangement by means of a pressure medium, preferably a hydraulic medium, wherein the actuating piston divides the pressure chamber from an associated centrifugal force pressure compensation chamber holding a pressure compensation medium which compensates for increases in pressure in the pressure chamber caused by centrifugal force and, consequently, for forces on the actuating piston caused by centrifugal force.

The centrifugal force pressure compensation chamber can be connected to a pressure compensation medium supply in order to supply pressure compensation medium to the centrifugal force pressure compensation chamber at least in a requested operating state of the clutch device. The pressure compensation medium supply can be formed by a hydraulic medium supply or a separate operating fluid supply, possibly an operating oil supply, which also serves to supply at least one other functional unit of the clutch unit.

When a return spring or restoring spring arrangement is provided for restoring the actuating piston, this restoring spring arrangement can be received in the centrifugal force pressure compensation chamber in order to economize on installation space.

It is particularly preferable that a sealing arrangement associated with the pressure compensation chamber and/or a boundary wall of the pressure compensation chamber are/is so arranged and so constructed in an elastic manner that they/it at least reinforce/reinforces a disengagement of the clutch arrangement in a stroke area of the actuating piston comprising a stroke position of the actuating piston corresponding to an engaged state of the respective clutch arrangement. The sealing arrangement and/or boundary wall can accordingly assume the function of a spring element which reinforces or brings about the opening of the actuating piston. As a rule, the above-mentioned restoring spring arrangement is additionally provided to move the piston to its rest position corresponding to a fully released clutch arrangement. The reinforcement of the releasing movement provided by the sealing arrangement and/or boundary wall is particularly advisable insofar as it often comes about that the clutch arrangement can be released quickly, for example, when the clutch arrangement is to be operated with regulated slip. Various factors can work against a quick release, for example, inertial forces which are exerted on the piston by a cooling fluid, especially cooling oil, or inertial forces which are mediated by the cooling fluid and act on the piston or which are based on the mass moment of inertia; as a rule, these inertial forces are particularly prominent when the piston releasing movement is introduced. For this reason, it is useful to reinforce the introduction of the piston releasing movement in the suggested manner above all.

The sealing arrangement can have a sealing element which is arranged at a wall portion defining the pressure compensation chamber and can engage tightly with the latter and with the actuating piston. The sealing element can project from the wall portion in the direction of the stop face of the actuating piston and, at least in the engaged state of the clutch arrangement, can transmit elastic restoring forces to the actuating piston in the direction of a stroke position corresponding to a released state of the clutch arrangement. The sealing element can be injection-molded at an edge area of the wall portion or can be fitted over the edge area. This is particularly simple in terms of assembly and, moreover, provides for a secure positioning of the sealing element at the wall portion.

According to a second independent aspect of the invention, for a double-clutch device, for arranging in a drivetrain of a motor vehicle between a drive unit and a transmission, wherein the clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements has an actuating piston defining a pressure chamber for actuation, preferably for engagement of the clutch arrangement by means of a pressure medium, preferably a hydraulic medium, and that the clutch arrangements are constructed as plate clutch arrangements, of which a radial outer clutch arrangement annularly encloses a radial inner clutch arrangement, wherein the actuating piston associated with the radial outer clutch arrangement is guided at a plate carrier, preferably an outer plate carrier, of the radial outer clutch arrangement and at a plate carrier, preferably an outer plate carrier, of the radial inner clutch arrangement so as to be axially displaceable and so as to seal the pressure chamber.

As a result of the above-mentioned guiding of the actuating piston at the plate carriers, the actuating piston is axially guided in a secure manner so that high operating reliability is achieved and, on the other hand, an especially compact construction of the clutch device is made possible, since no separate guide elements are required for guiding the piston and installation space can accordingly be economized on. When a centrifugal force pressure compensation chamber is provided, which receives the pressure compensation medium and is defined or limited by the actuating piston, the actuating piston can also guide the centrifugal force pressure compensation chamber at the plate carrier in a sealing manner.

With respect to an especially compact construction of the clutch device, it is further suggested that the centrifugal force pressure compensation chamber associated with the radial outer clutch arrangement is defined by a plate carrier, preferably an outer plate carrier, of the radial inner clutch arrangement. Accordingly, a separate wall for forming the pressure compensation chamber can be completely dispensed with, if desired.

Installation space can also be economized on in a corresponding manner in that an actuating piston associated with the radial inner clutch arrangement is guided so as to be axially displaceable at a plate carrier, preferably an outer plate carrier, of the radial inner clutch arrangement and, as the case may be, at a wall of a centrifugal force pressure compensation chamber, if provided, which is associated with the actuating piston, and so as to seal the associated pressure chamber and, as the case may be, the centrifugal force pressure compensation chamber which receives the pressure compensation medium. In this connection, it is advisable that sealing elements cooperating with the actuating pistons are arranged so as to be radially staggered and preferably partially overlapping axially.

With respect to an optimum utilization of the installation space, it can be provided that at least one of the centrifugal force pressure compensation chambers extends over a different radial area than the associated pressure chamber in such a way that an effective pressure application surface of the piston on the pressure chamber side is smaller than an effective pressure application surface of the piston on the pressure compensation chamber side and/or that a pressure compensation chamber limiting surface of the piston extends farther radially outward than a pressure chamber limiting surface of the piston. In order to avoid an overcompensation of the centrifugal force which could possibly occur when the pressure compensation chamber is completely filled with pressure compensation medium (in this regard, the radius dependency of the pressure increase in the pressure chamber and in the pressure compensation chamber caused by centrifugal force must be taken into account), fill level limiting means can be allocated to the pressure compensation chamber to limit the filling of the pressure compensation chamber with pressure compensation medium to a maximum radial partial filling level. The fill level limiting means can comprise at least one pressure compensation medium through-opening in a wall of the pressure compensation chamber extending in radial direction.

According to a third independent aspect of the invention, for a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that at least one of the clutch arrangements has an actuating piston defining a pressure chamber for actuation, preferably for engagement of the clutch arrangement by means of a pressure medium, preferably a hydraulic medium, wherein the actuating piston is guided at a wall portion defining the pressure chamber and/or at a wall portion defining an associated pressure compensation chamber and/or so as to seal the pressure compensation chamber, wherein a labyrinth seal comprising at least one annular groove in a surface portion of the actuating piston and/or of the wall portion, which surface portion extends in an engaging-disengaging direction of the actuating piston, acts between the respective wall portion and the piston, and/or wherein at least one sealing ring acts between the respective wall portion and the piston, which sealing ring is secured to one actuating piston and wall portion on the one hand and acts at the other actuating piston and wall portion with axial play relative to one actuating piston and wall portion on the other hand and is acted upon during an engaging movement and/or during a disengaging movement of the actuating piston such that the sealing engagement with the wall portion and/or actuating piston increases.

When a labyrinth seal of the type mentioned above is provided, separate sealing elements made of rubber, plastic or elastomer material, for example, can be dispensed with and the seal and associated counter-element can be made of the same material with, consequently, the same thermal coefficient of expansion. It is extremely advantageous for both sealing members of the labyrinth seal to have the same thermal coefficient of expansion insofar as temperature changes or temperature fluctuations cause no changes, or no substantial changes, in the engagement or frictional engagement, as the case may be, between the sealing members which would lead to corresponding fluctuations in inertial forces to be overcome during the engaging and disengaging movement of the piston. Further, there are no substantial fluctuations in the sealing action, especially no loss of tightness.

The other constructional variant according to the invention with the sealing ring which is fixed on one side and engages with axial play on the other side is advantageous insofar as particularly good sealing can be achieved, for example, when the sealing ring is additionally acted upon by the pressure in the pressure chamber or pressure compensation chamber to strengthen the sealing engagement in such a way that the sealing ring is pressed more firmly into a shaped portion receiving the sealing ring. This takes place to a marked degree in the case of the pressure chamber when the clutch is engaged with the stationary piston in its moved out or disengaged position, i.e., when the plate stack is tensioned to a maximum degree and as little leakage as possible should occur.

It is assumed in the preceding remarks that the sealing ring is acted upon to increase the sealing engagement during an engaging movement and reaches a maximum sealing engagement in the end position of the actuating piston. However, if it should seem advisable, the maximum sealing engagement could also be provided in a middle stroke position of the piston or in the end position of the actuating piston corresponding to a released clutch.

The sealing ring can engage in an annular groove of the actuating piston or of the wall portion. Further, the sealing ring can have at least one portion which acts, for example, in the manner of a stripper, at a surface region of the actuating piston or of the wall portion which extends in an engaging-disengaging direction of the actuating piston and which is plane in this direction.

It is suggested that the sealing ring is curved in axial direction in a state of lower tension with a looser sealing engagement with respect to a section plane containing or parallel to an axis of rotation of the clutch device and is moved to a state of higher tension with a tighter sealing engagement during an engaging movement and/or during a disengaging movement of the actuating piston in that it is stretched with respect to the section plane or is less sharply curved in axial direction.

As was already indicated, it is preferred in general that the sealing ring is acted upon to the maximum sealing engagement in the engaged state of the respective clutch arrangement.

The wall portion defining the pressure chamber can be a plate carrier, preferably an outer plate carrier, of the respective clutch arrangement constructed as plate clutch arrangement.

When the sealing ring is inserted into a shaped portion or cutout of the actuating piston on one side and acts at the plane surface portion on the other side, axial installation space can be economized on in that the shaped portion is provided in the edge area of a radially extending piston portion. Thin wall thicknesses are made possible in this way. The shaped portion, possibly, a groove, can then be rolled in if desired. In order to economize on axial installation space, it is also helpful that the sealing ring can be elongated in cross section in radial direction as suggested according to the invention without the risk of impairing the sealing action.

According to a fourth aspect of the invention, for a double-clutch device, for arranging in a drivetrain of a motor vehicle between a drive unit and a transmission, which clutch device has a first clutch arrangement associated with a first transmission input shaft of the transmission and a second clutch arrangement associated with a second transmission input shaft of the transmission for transmitting torque between the drive unit and the transmission, it is suggested that each of the clutch arrangements has an actuating piston defining a pressure chamber for actuation, preferably for engagement of the clutch arrangement by means of a pressure medium, preferably a hydraulic medium, wherein a radial outer sealing element (designated as first sealing element with respect to the pressure chamber) which seals the pressure chamber of the first clutch arrangement on the radial outer side and/or axially and which acts between the actuating piston and a wall of the pressure chamber and a radial outer sealing element (designated as second sealing element with respect to the pressure chamber) which seals the pressure chamber of the second clutch arrangement on the radial outer side and/or axially and which acts between the actuating piston and a wall of the pressure chamber are arranged at different radial distances from an axis of rotation of the clutch device, and/or wherein a radial inner sealing element (designated as third sealing element with respect to the pressure chamber) which seals the pressure chamber of the first clutch arrangement at the radial inner side and/or axially and which acts between the actuating piston and a wall of the pressure chamber and a radial inner sealing element (designated as fourth sealing element with respect to the pressure chamber) which seals the pressure chamber of the second clutch arrangement at the radial inner side and/or axially and which acts between the actuating piston and a wall of the pressure chamber are arranged at different radial distances from an axis of rotation of the clutch device.

Due to the different radial spacing of the sealing elements provided according to the invention, the radial and/or axial installation space of the clutch device can be kept comparatively small. In order to make possible a particularly compact construction of the clutch device, it is suggested in a further development that the first and second sealing elements and/or the third and fourth sealing elements are so arranged with respect to a section plane containing or parallel to the axis of rotation of the clutch device that a straight line which intersects both sealing elements encloses, with an axis of rotation of the clutch device, an angle α of approximately 10° to 70°, preferably approximately 20° to 50°, most preferably approximately 30° to 40°, at least in the disengaged state of the two clutch arrangements and/or in the engaged state of the two clutch arrangements.

The actuating piston preferably divides the respective pressure chamber from an associated pressure compensation chamber which receives a pressure compensation medium. For this purpose, it is suggested by way of a further development that a radial outer sealing element (designated as fifth sealing element with respect to the pressure compensation chamber) which seals the pressure compensation chamber of the first clutch arrangement on the radial outer side and/or axially and which acts between the actuating piston and a wall of the pressure compensation chamber and a radial outer sealing element (designated as sixth sealing element with respect to the pressure compensation chamber) which seals the pressure compensation chamber of the second clutch arrangement on the radial outer side and/or axially and which acts between the actuating piston and a wall of the pressure compensation chamber are arranged at different radial distances from an axis of rotation of the clutch device, and/or that a radial inner sealing element (designated as seventh sealing element with respect to the pressure compensation chamber) which seals the pressure compensation chamber of the first clutch arrangement on the radial inner side and/or axially and which acts between the actuating piston and a wall of the pressure compensation chamber and a radial inner sealing element (designated as eighth sealing element with respect to the pressure compensation chamber) which seals the pressure compensation chamber of the second clutch arrangement on the radial inner side and/or axially and which acts between the actuating piston and a wall of the pressure compensation chamber are arranged at different radial distances from an axis of rotation of the clutch device.

According to this suggestion, a construction of the clutch device which is comparatively compact radially and/or axially can be achieved in spite of the provided pressure compensation chambers especially when the fifth and sixth sealing elements and/or the seventh and eighth sealing elements are so arranged with respect to a section plane containing or parallel to the axis of rotation of the clutch device that a straight line which intersects both sealing elements encloses, with an axis of rotation of the clutch device, an angle α of approximately 10° to 70°, preferably approximately 30° to 60°, most preferably approximately 40° to 50°, at least in the disengaged state of the two clutch arrangements and/or in the engaged state of the two clutch arrangements.

It is suggested for the sealing elements mentioned above that the first and the fifth sealing element are separate sealing elements which are preferably arranged at an essentially identical radial distance from the axis of rotation of the clutch device, and/or that the second and the sixth sealing elements are separate sealing elements which are preferably arranged at an essentially identical radial distance from the axis of rotation of the clutch device, and/or that the third and the seventh sealing elements are formed by a sealing element associated with both the pressure chamber and the pressure compensation chamber, and/or that the fourth and the eighth sealing elements are formed by a sealing element associated with both the pressure chamber and the pressure compensation chamber. In general, however, the seals can also be arranged on different diameters, wherein a matching of the pressures in the piston chambers can be achieved by selecting the diameters so as to be adapted to one another.

The features of a multiple-clutch device and a drivetrain which were indicated in connection with the different aspects of the invention can be advantageously combined. Further independent aspects of the invention will be discerned by the person skilled in the art from the preceding explanations and the description of the Figures.

The invention is further directed to a drivetrain for a motor vehicle with a clutch device, according to at least one aspect of the invention, arranged between a drive unit and a transmission.

The invention will be described more fully in the following with reference to embodiment examples shown in the Figures.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIGS. 7a) and 7b) are showings of sealing the lid with the clutch housing wherein a sealing ring is carried in the lid and in the housing respectively.

FIGS. 7c) and 7d) show alternate ways of sealing the pressure chambers and the pressure compensation chambers in the dowlde clutch.

DETAILED DESCRIPTION OF THE PRESENTLY PREFERRED EMBODIMENTS

Figure 1:
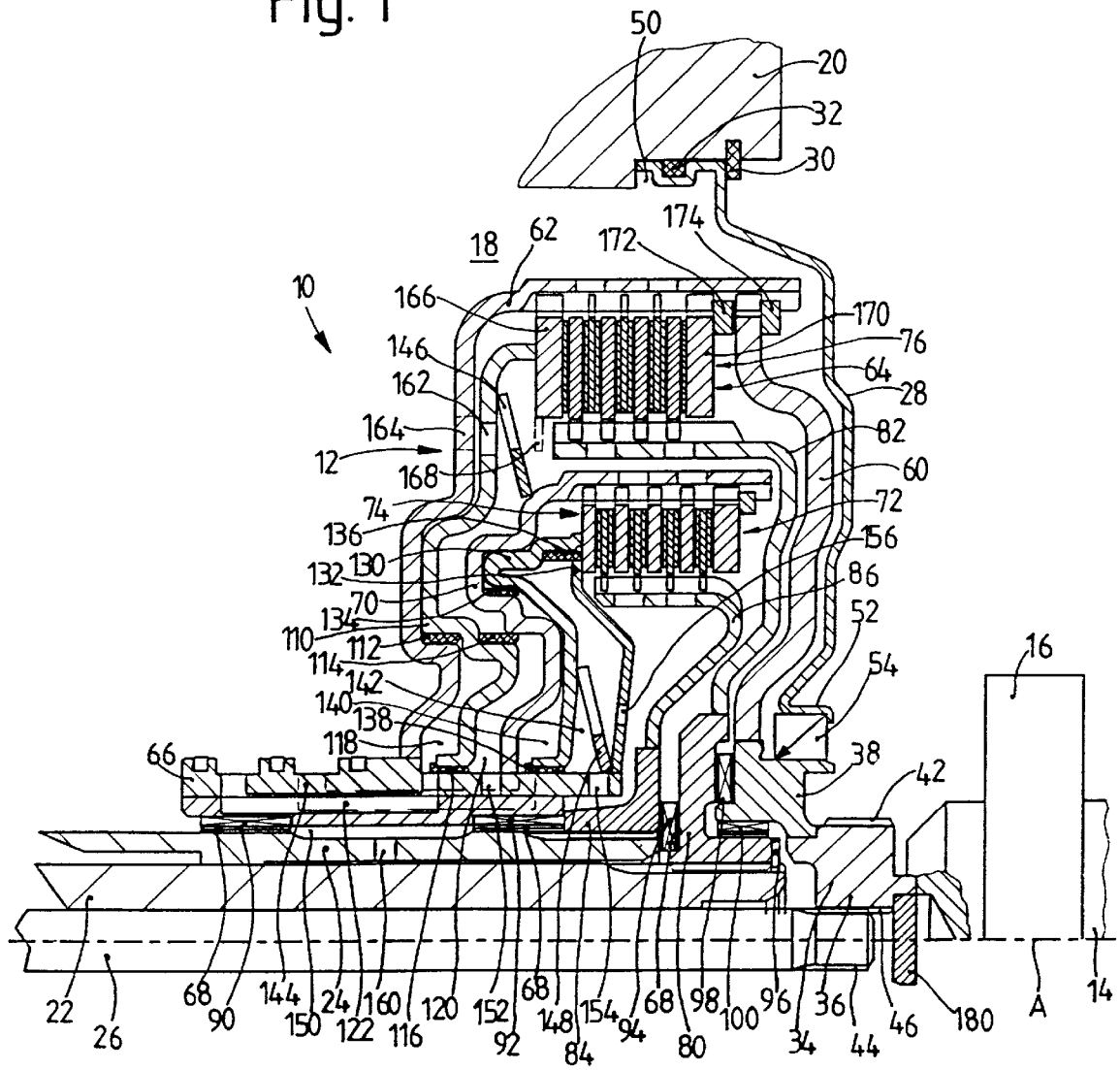
FIG. 1 is a view in partial section showing a double-clutch with two plate clutch arrangements which is arranged in a drivetrain of a motor vehicle between a transmission and a drive unit.

FIG. 1 shows a double-clutch 12 arranged in a drivetrain 10 between a drive unit and a transmission. The drive unit, for example, an internal combustion engine, is represented in FIG. 1 only by a driven shaft 14, such as a crankshaft 14, with a coupling end 16 serving to connect a torsional vibration damper, not shown. In FIG. 1, the transmission is represented by a transmission housing portion 20 defining a transmission housing cover 18 and by two transmission input shafts 22 and 24, both of which are constructed as hollow shafts, wherein transmission input shaft 22 extends through transmission input shaft 24 substantially coaxial thereto. A pump drive shaft which serves to drive a transmission-side oil pump, not shown in FIG. 1, as will be described more fully in the following, is arranged in the interior of the transmission input shaft 22.

The double-clutch 12 is received in the transmission housing cover 18, wherein the interior of the cover is closed in the direction of the drive unit by a lid 28 which is pressed into a cover housing opening and/or is secured therein by a snap ring 30. When the double-clutch has wet-type friction clutches as in the embodiment example shown in FIG. 1, for example, diaphragm clutches, it is generally arranged to provide for a tight engagement between the lid 28 and the transmission housing formed by the transmission housing cover 18, which can be produced, for example, by an O-ring or other sealing ring. FIG. 1 shows a sealing ring 32 with two sealing lips.

A clutch hub 34 which is formed of two ring portions 36, 38 secured to one another for reasons which will be explained more fully serves as the input side of the double-clutch 12. The clutch hub 34 extends through a central opening of the lid 28 in the direction of the drive unit and is coupled with the torsional vibration damper, not shown, via an external toothing 42, so that there is a torque-transmission connection between the coupling end 16 of the crankshaft 14 and the clutch hub 34 by way of this torsional vibration damper. If it is desirable to dispense with a torsional vibration damper in general, or at this location in the drivetrain, the clutch hub 34 can also be coupled directly with the coupling end 16. At its end remote of the transmission, the pump drive shaft 26 has an external toothing 44 which engages in an internal toothing 46 of the ring portion 36 of the clutch hub 34, so that the pump drive shaft 26 rotates along with the clutch hub 34 and consequently drives the oil pump when a rotational movement is imparted to the clutch hub 34, as a rule, by the drive unit and in many operating situations possibly also by the transmission via the double-clutch (for example, in the operating situation characterized under the heading of "engine brake").

The lid 28 extends radially between an annular circumferential wall portion of the housing cover 18, which defines a radial recess 50 of the housing cover 18, and the ring portion 38 of the hub 34. It is advantageous when a sealing arrangement and/or pivot bearing arrangement 54 are/is provided between a radial inner wall area 52 of the lid 28 and the hub 34, especially the ring portion 38, particularly when—as in the shown embodiment example—the lid 28 is secured to the housing cover 18 and consequently does not rotate along with the double-clutch 12. Sealing between the lid and the hub is required particularly when the clutch arrangements of the double-clutch are wet-type clutches as in the embodiment example. A high degree of operational reliability is also achieved in case of oscillations and vibrations when the sealing and/or pivot bearing arrangement 54 is secured axially to the lid 28 and/or to the clutch hub 34, for example, by means of an end portion of the lid edge 52 which is bent radially inward as is shown in FIG. 1.

A carrier plate 60 is arranged at the ring portion 38 of the hub 34 so as to be fixed with respect to rotation relative to it and serves to transmit torque between the hub 34 and an outer plate carrier 62 of a first plate clutch arrangement 64. The outer plate carrier 62 extends in the direction of the transmission and radially inward to a ring part 66 at which the outer plate carrier is arranged so as to be fixed with respect to rotation relative to it, this ring part 66 being supported at the two transmission input shafts 22 and 24 by means of an axial and radial bearing arrangement 68 in such a way that both radial and axial forces are supported at the transmission input shafts. The axial and radial bearing arrangement 68 enables relative rotation between the ring part 66 on the one hand and the transmission input shaft 22 and transmission input shaft 24 on the other hand. The construction and operation of the axial and radial bearing arrangement will be discussed at greater length in the following.

An outer plate carrier 70 of a second plate clutch arrangement 72 is arranged at the ring part 66 farther axially in the direction of the drive unit so as to be fixed with respect to rotation relative to it, the plate stack 74 of the second plate clutch arrangement 72 being enclosed annularly by plate stack 76 of the first plate clutch arrangement. As was already indicated, the two outer plate carriers 62 and 70 are connected with one another by the ring part 66 so as to be fixed with respect to relative rotation and, together, by way of the carrier plate 60 which is in a positive-locking torque-transmitting engagement with the outer plate carrier 62 by means of an external toothing, are in a torque-transmitting connection with the clutch hub 34 and therefore—via the torsional vibration damper, not shown—with the crankshaft 14 of the drive unit. With respect to the normal flow of torque from the drive unit to the transmission, the outer plate carriers 62 and 70 serve as the input side of the plate clutch arrangement 64 and 72, respectively.

A hub part 80 of an inner plate carrier 82 of the first plate clutch arrangement 64 is arranged on the transmission input shaft 22 so as to be fixed with respect to rotation relative to it by means of a keyway toothing or the like. In corresponding manner, a hub part 84 of an inner plate carrier 86 of the second plate clutch arrangement 72 is arranged on the radially outer transmission input shaft 24 so as to be fixed with respect to rotation relative to it by means of a keyway toothing or the like. With respect to the normal torque flow from the drive unit in the direction of the transmission, the inner plate carriers 82 and 86 serve as output side of the first and second plate clutch arrangement 64 and 72, respectively.

Referring again to the radial and axial bearing support of the ring part 66 at the transmission input shafts 22 and 24, two radial bearing subassemblies 90 and 92 which act between the radial outer transmission input shaft 24 and the ring part 66 serve to support the ring part 66 radially. With respect to support in the direction of the drive unit, the axial bearing support of the ring part 66 is carried out by hub part 84, axial bearing 94, hub part 80 and a snap ring 96 which secures the hub part 80 axially to the radial inner transmission input shaft 22. The ring part 38 of the clutch hub 34 is again supported via an axial bearing 98 and a radial bearing 100 at the hub part 80. The hub part 30 is supported axially in the direction of the transmission via the axial bearing 94 at an end portion of the radial outer transmission input shaft 24. The hub part 84 can be supported directly at an annular stop or the like or at a separate snap ring or the like in the direction of the transmission at the transmission input shaft 24. Since the hub part 84 and the ring part 66 are rotatable relative to one another, an axial bearing can be provided between these components insofar as the bearing 92 does not perform both the function of an axial bearing and the function of a radial bearing. The latter is assumed in the embodiment example in FIG. 1.

As is shown in the embodiment example, it is very advantageous when the portions of the outer plate carriers 62 and 70 extending in radial direction are arranged on an axial side of a radial plane extending to an axis A of the double-clutch 12 and the portions of the inner plate carriers 82 and 86 of the two plate clutch arrangements extending in radial direction are arranged on the other axial side of this radial plane. In this way, a particularly compact construction is possible, especially when—as is shown in the embodiment example—plate carriers of one type (outer plate carrier, as in the embodiment example, or inner plate carrier) are connected with one another so as to be fixed with respect to rotation and serve in each instance as the input side of the respective plate clutch arrangement with respect to the flow of force from the drive unit to the transmission.

Actuating pistons are integrated in the double-clutch 12 for actuating the plate clutch arrangements, in the case of the embodiment example shown, for actuating the plate clutch arrangements for the purpose of engagement. An actuating piston 110 associated with the first plate clutch arrangement 64 is arranged axially between the radially extending portion of the outer plate carrier 62 of the first plate clutch arrangement 64 and the radially extending portion of the outer plate carrier 70 of the second plate clutch arrangement 72 and is axially displaceable at both outer plate carriers and at the ring part 66 by means of seals 112, 114, 116 and guided so as to seal a pressure chamber 118 formed between the outer plate carrier 62 and the actuating piston 110 and a centrifugal force pressure compensation chamber 120 formed between the actuating piston 110 and the outer plate carrier 70. The pressure chamber 118 communicates, via a pressure medium channel 122 formed in the ring part 66, with a pressure control device, e.g., a control valve, connected to a pressure medium supply, in this case, the oil pump mentioned above. The pressure medium channel 122 is connected to the pressure control device via a connection sleeve which receives the ring part 66 and which is fixed relative to the transmission. In this connection, it should be added with reference to the ring part 66 that this ring part 66 is produced in two parts with two sleeve-like ring part portions inserted one inside the other as is indicated in FIG. 1 in order to simplify production especially with regard to the pressure medium channel 122 and an additional pressure medium channel.

An actuating piston 130 associated with the second plate clutch arrangement 72 is arranged axially between the outer plate carrier 70 of the second plate clutch arrangement 72 and a substantially radially extending wall portion 132, which is arranged at an axial end area of the ring part 66 remote of the transmission so as to be fixed with respect to relative rotation it and so as to be tight against fluid, and is guided so as to be axially displaceable by means of seals 134, 136 and 138 at the outer plate carrier 70, wall portion 132 and ring part 66 and is guided so as to seal a pressure chamber 140 formed between the outer plate carrier 70 and the actuating piston 130 and a centrifugal force pressure compensation chamber 142 formed between the actuating piston 130 and the wall portion 132. The pressure chamber 140 is connected via another pressure medium channel 144 (mentioned above) in a manner corresponding to pressure chamber 118 at a/the pressure control device. Pressure can be applied by means of the pressure control device(s) to the two pressure chambers 118 and 140 selectively (possibly also simultaneously) from the pressure medium source (in this case, the oil pump) in order to actuate the first plate clutch arrangement 64 and/or the second plate clutch arrangement 72 for purposes of engagement. Diaphragm springs 146, 148, are used for resetting, that is, for releasing the clutches; the diaphragm spring 148 associated with the actuating piston 130 is received in the centrifugal force pressure compensation chamber 142.

The pressure chambers 118 and 140 are completely filled with pressure medium (in this case, hydraulic oil) in every case during normal operating states of the double-clutch 12, and the actuating state of the plate clutch arrangements depends on the pressure of the pressure medium Present at the pressure chambers. However, since the outer plate carriers 62 and 70, including the ring part 66, the actuating pistons 110 and 130 and the wall portion 132, rotate along with the crank shaft 14 during driving operation, pressure increases due to centrifugal force occur in the pressure chambers even when no pressure is applied to the pressure chambers 118 and 140 proceeding from the pressure control device; these increases in pressure could lead to unwanted engagement or at least grinding of the plate clutch arrangements at least at higher rotational speeds. The centrifugal force pressure compensation chambers 120, 142 mentioned above are provided for this reason. These centrifugal force pressure compensation chambers 120, 142 hold a pressure compensation medium, and pressure increases caused by centrifugal force are brought about therein in a corresponding manner to compensate for the pressure increases due to centrifugal force which occur in the pressure chambers.

It is possible to fill the centrifugal force pressure compensation chambers 120 and 142 permanently with pressure compensation medium, for example, oil, wherein volume compensation could be provided, if need be, for receiving pressure compensation medium which is displaced in the course of actuating the actuating pistons. In the embodiment form shown in FIG. 1, the centrifugal force pressure compensation chambers 120, 142 are first filled with pressure compensation medium when the drivetrain is in operation, namely, in connection with the supply of cooling fluid, especially cooling oil as in the embodiment example, to the plate clutch arrangements 64 and 72 via an annular channel 150 formed between the ring part 66 and the outer transmission input shaft 24, wherein the bearings 90, 92 through which cooling oil can pass are associated with this ring channel 150. The cooling oil flows from a transmission-side connection between the ring part and transmission input shaft 24 in the direction of the drive unit through bearing 90 and bearing 92 and then flows in a partial flow between the end portion of the ring part 66 remote of the transmission and the hub part 84 radially outward in the direction of the plate stack 74 of the second plate clutch arrangement 72, enters the area of the plates because of the through-openings in the inner plate carrier 86, flows between the plates of the plate stack 74 and radially outward through friction facing grooves or the like in these plates, enters the area of plate stack 76 of the first plate clutch arrangement 64 through through-openings in the outer plate carrier 70 and through-openings in the inner plate carrier 82, flows radially outward between the plates of this plate stack or though friction facing grooves or the like in these plates, and then finally flows radially outward through through-openings in the outer plate carrier 62. The centrifugal force pressure compensation chambers 120, 142 are also connected to the cooling oil feed flow between the ring part 66 and the transmission input shaft 24, namely, by means of radial bore holes 152, 154 in the ring part 66. Since the cooling oil serving as pressure compensation medium in the pressure compensation chambers 120, 142 runs out of the pressure compensation chambers due to the absence of centrifugal forces when the drive unit is stationary, each of the pressure compensation chambers is re-filled during operation of the drivetrain (of the motor vehicle).

Since a pressure application surface of the actuating piston 130 associated with the pressure chamber 140 is smaller and, moreover, extends less far radially outward than a pressure application surface of the piston 130 associated with the pressure compensation chamber 142, at least one fill level limiting opening 156 which adjusts a maximum radial filling level of the pressure compensation chamber 142 giving the required centrifugal force compensation is formed in the wall portion 132. When the maximum filling state is reached, the cooling oil supplied via the bore hole 154 flows through the filling level limiting opening 156 and unites with the cooling oil flow passing radially outward between the ring part 66 and hub part 84. With respect to the piston 110, the pressure application surfaces of the piston associated with the pressure chamber 118 and the pressure compensation chamber 120 are the same size and extend within the same radial area, so that corresponding fill level limiting means are not required for the pressure compensation chamber 120.

For the sake of completeness, it should be mentioned that additional cooling flows preferably occur in operation. Accordingly, at least one radial bore hole 160 is provided in the transmission input shaft 24, wherein another cooling oil partial flow flows through this radial bore hole 160 and through an annular channel between the two transmission input shafts. This other cooling oil partial flow divides into two partial flows, one of which flows radially outward between the two hub parts 80 and 84 (through the axial bearing 94) and the other partial flow flows radially outward between the end area of the transmission input shaft 22 remote of the transmission and the hub part 80 and between this hub part 84 and the ring portion 38 of the clutch hub 34 (through the bearings 98 and 100).

Since the cooling oil flowing radially outward could accumulate next to a radially outer portion of the actuating piston 110 associated with the first plate clutch arrangement 64 and could impede the engaging movement of this piston due to centrifugal force at least at higher rotational speeds, the piston 110 has at least one pressure compensation opening 162 which enables a cooling oil flow from one side of the piston to the other. Consequently, an accumulation of cooling oil will come about on both sides of the piston with corresponding compensation of pressure forces exerted on the piston due to centrifugal force. Further, other forces based on an interaction of the cooling oil with the piston are prevented from impeding the required axial piston movements. This refers, for example, to hydrodynamic forces or the like and suction attachment of the piston to the outer plate carrier 62.

It is also possible to provide at least one cooling oil outlet opening in the radially extending, radially outer area of the outer plate carrier 62 of the first plate clutch arrangement 64. A cooling oil outlet opening of this kind is indicated in dashes at 164. In order to ensure a sufficient flow of cooling fluid (cooling oil) through the plate stack 76 of the first plate clutch arrangement 64 in spite of this, a cooling oil conducting element (generally, a cooling fluid conducting element) can be provided. It is indicated in dashed lines in FIG. 1 that an adjacent end plate 166 of the plate stack 76 could have a cooling oil conducting portion 168, so that the end plate 166 itself serves as a cooling oil conducting element.

With respect to a simple construction of the pressure control device for the actuation of the two plate clutch arrangements, it was provided in the embodiment example of FIG. 1 that a torque transmitting capacity which is given, per se, for the radial inner plate clutch arrangement 72 with reference to an actuating pressure and which is smaller compared to the other clutch arrangement 64 (because of a smaller effective friction radius than the radial outer clutch arrangement 64) is at least partially compensated. For this purpose, the pressure application surface of the piston 130 associated with the pressure chamber 140 is larger than the pressure application surface of the piston 110 associated with the pressure chamber 118, so that axially directed forces greater than those exerted on the piston 110 are exerted on piston 130, given the same hydraulic oil pressure in the pressure chambers.

It should be mentioned that the available installation space is made use of in a favorable manner due to a radial staggering of the seals associated with the piston, especially also an axial overlapping of at least some of the seals.

In addition to the above-mentioned supply of cooling oil and the forming of cooling oil through-openings (indicated only schematically in FIG. 1) in the plate carriers, steps can be taken in the plate stacks 74, 76 to prevent the risk of overheating. Accordingly, at least some of the plates are advantageously used as "heat buffers" that temporarily store heat which is formed, for example, during slip operation and which temporarily overburdens the heat dissipation possibilities allowed by cooling fluid (in this case, cooling oil) or by heat conductance via the plate carriers; in this way, the heat can be carried off at a later time, for instance, in a disengaged state of the respective plate clutch arrangement. For this purpose, the plates in the radial inner (second) plate clutch arrangement which have no friction facings are constructed so as to be thicker axially than plate carrier elements of plates having friction facings in order to provide a comparatively large material volume with corresponding heat capacity for plates without friction facings. These plates should be made of a material having a considerable heat storage capability (heat capacity), for example, steel. The plates having friction facings can temporarily store only a little heat when using conventional friction facings made from paper, for example, since paper has poor heat conductivity.

The heat capacity of the elements having friction facings can likewise be made available as heat storage when facing materials with high conductivity are used instead of facing materials with low conductivity. It is possible to use friction facings of sintered material which has a comparatively high heat conductivity. However, the problem with the use of sintered facings is that the sintered facings have a degressive curve of the coefficient of friction $\mu$ over slippage speed (relative rotational speed $\Delta N$ between the rubbing surfaces); that is, $d\mu/d\Delta b\, N < 0$. A degressive curve of the coefficient of friction is disadvantageous insofar as it can promote self-excitation of oscillations in the drivetrain or, at least, cannot damp such oscillations. Therefore, it is advantageous when plates with friction facings of sintered material as well as plates with friction facings of another material with a progressive curve of the coefficient of friction over the slippage speed ($d\mu/d\Delta N > 0$) are provided in a plate stack, so that a progressive curve of the coefficient of friction over the slippage speed results for the plate stack as a whole or there is at least approximately a neutral curve of the coefficient of friction over the slippage speed ($d\mu/d\Delta N = 0$) and, consequently, self-excitation of oscillations in the drivetrain is at least not promoted or, preferably, torsional vibrations in the drivetrain are even damped (because of a considerable progressive curve of the coefficient of friction over the slippage speed).

It is assumed in this connection that in the embodiment example of FIG. 1 the plate stack 74 of the radial inner plate clutch arrangement 60 is constructed without sintered facings, since the radial outer plate clutch arrangement 64 is preferably used as a starting clutch with corresponding slip operation. The latter, that is, the use of the radial outer plate clutch arrangement as a starting clutch, is advantageous insofar as this plate clutch arrangement can be operated with lower actuating forces (for the same torque transmitting capacity) because of the larger effective friction radius, so that the area pressure can be reduced relative to the second plate clutch arrangement. For this purpose, it is also helpful when the plates of the first plate clutch arrangement 64 are formed with a somewhat greater radial height than the plates of the second plate clutch arrangement 72. However, if desired, friction facings of sintered material can also be used for the plate stack 74 of the radial inner (second) plate clutch arrangement 72, preferably, as was already mentioned, in combination with friction facings of another material such as paper.

In the plate stack 74 of the radial inner plate clutch arrangement 72, all inner plates have friction facings and all outer plates are without friction facings, wherein the end plates defining the plate stack axially are outer plates and accordingly have no facings; in the plate stack 76 of the first plate clutch arrangement 64, the inner plates have no facings and the outer plates, including the end plates 166, 170, have friction facings. According to a preferred construction, at least the end plates 166 and 170 have facing-carrying elements which are substantially thicker axially than the facing-carrying elements of the other outer plates and are formed with facings of sintered material, so that the facing-carrying elements of the two end plates which have a comparatively large volume can be put to use as heat buffers. As with the plate stack 74, the plates having no facings are thicker axially than the plate carrying elements of the plates having friction facings (with the exception of the end plates) in order to provide a comparatively large heat capacity for temporary storage of heat. The outer plates located axially inside should, at least in part, have friction facings of a different material exhibiting a progressive curve of the coefficient of friction in order to achieve at least an approximately neutral curve of the coefficient of friction over the slippage speed for the plate stack as a whole.

Further details of the double-clutch 12 according to the described embodiment example can be readily discerned from FIG. 1 by the person skilled in the art. For example, the axial bore hole in the ring portion 36 of the clutch hub 34 in which is formed the internal toothing 46 for the pump drive shaft is closed so as to be tight against oil by means of a stopper 180 secured therein. The carrier plate 60 is fixed axially to the outer plate carrier 62 by two retaining rings 172, 174, wherein retaining ring 172 also supports the end plate 170 axially. A corresponding retaining ring is also provided for supporting the plate stack 74 at the outer plate carrier 70.

With respect to the construction of the outer plates of the first plate clutch arrangement 64 as facing-carrying plates, it should be added that an improved through-flow through the plate stack 76 is achieved in connection with the allocation of the outer plates to the input side of the clutch device when the friction facings—as is generally the case—are formed with friction facing grooves or other fluid passages which enable flow through the plate stack also in the state of frictional engagement. Since the input side also rotates along with the running drive unit and the coupling end 16 when the clutch arrangement is released, a kind of conveying action is brought about because of the revolving friction facing grooves and the revolving fluid passages, so that the through-flow through the plate stack is improved in a corresponding manner. In contrast to the view in FIG. 1, the second plate clutch arrangement could also be constructed accordingly, that is, the outer plates could be constructed as plates having friction facings.

Referring to FIGS. 2 to 14, further embodiment examples of the multiple-clutch devices according to the invention, especially double-clutch devices according to the invention, will now be described in relation to various aspects. Since the embodiment examples of FIGS. 2 to 14 correspond to the embodiment example of FIG. 1 with respect to basic construction and the views shown in FIGS. 2 to 14 will be immediately understood by the person skilled in the art based on the preceding detailed explanation of the embodiment example of FIG. 1, it will not be necessary to describe the embodiment examples in FIGS. 2 to 14 in all particulars. In this connection, reference is had to the preceding explanation of the embodiment example of FIG. 1 which can be carried over to a great extent to the embodiment examples in FIGS. 2 to 14. The reference numbers used for the embodiment examples of FIGS. 2 to 14 are the same as those used for the embodiment example in FIG. 1. For the sake of clarity, not all of the reference numbers in FIG. 1 are also shown in FIGS. 2 to 14 insofar as the double-clutches of the embodiment examples in FIGS. 2 to 14 correspond to the embodiment example of FIG. 1.

An important aspect for clutch devices with wet-type clutch arrangements is the sealing of the clutch space and, in connection with this, the fixing of the lid 28 in the opening of the clutch housing 20. In the embodiment examples in FIGS. 3, 6 and 7, the lid 28 is over dimensioned radially and is pressed into the opening of the clutch housing formed by the housing portion 20. The sealing ring 32 which seals the clutch housing is provided because the lid can sag or become wavy under certain circumstances. The sealing ring has the further object of damping any oscillations with axial relative movements between the lid 28 and the clutch housing. The sealing ring, which can be constructed as an O-ring, can be mounted at the lid and/or at the housing and, for this purpose, can be received in an annular groove of the housing (compare FIG. 7b) and/or in an annular groove of the lid (compare FIG. 7a) formed in an edge portion of the lid 28. For an enhanced sealing action, two or more O-rings which are arranged axially adjacent to one another could also be provided instead of one O-ring. Another possibility is to use a sealing ring with two or more sealing lips (compare FIG. 1 and FIG. 14).

For stricter requirements regarding tightness, the solutions applied in the embodiment examples of FIGS. 2, 6, 8, 9, 10, 11 and 12 can be considered. In some of these embodiment examples (compare, e.g., FIGS. 2 and 11), a rubber ring or plastic ring was inserted prior to mounting the lid 28 or, alternatively, an annular ring element was injection-molded. The respective sealing element provided in this manner is designated by 200 in the Figures. This elastic element, that is, the rubber or plastic ring or the injection-molded sealing element, is clamped axially between the lid 28 and the housing 20 when the lid is mounted. A double sealing is achieved in combination with the sealing ring 32. Also, the sealing element 32 can often be dispensed with because a very good sealing action is achieved by means of the axially clamped sealing element. Similar to the embodiment example in FIG. 1, a snap ring 30 takes over the function of axial securing when the clamping forces possibly acting between the lid 28 and the housing 20 are not sufficient. An alternative to the snap ring is realized in the embodiment example in FIG. 5. In this case, instead of the snap ring, an annular securing plate 210 is provided which is fastened to the clutch housing 20, e.g., by means of screws 212. Instead of an annular securing plate 210, a plurality of separate securing plate segments could also be in provided. The lid 28 is secured in this way also in the embodiment example in FIG. 8. Instead of an annular securing plate or a plurality of securing plate segments, screws which are screwed into the clutch housing and which have screw heads projecting in the radial area of the lid 28 or washer elements (for example, washers or springs) could also be provided.

Figure 9:
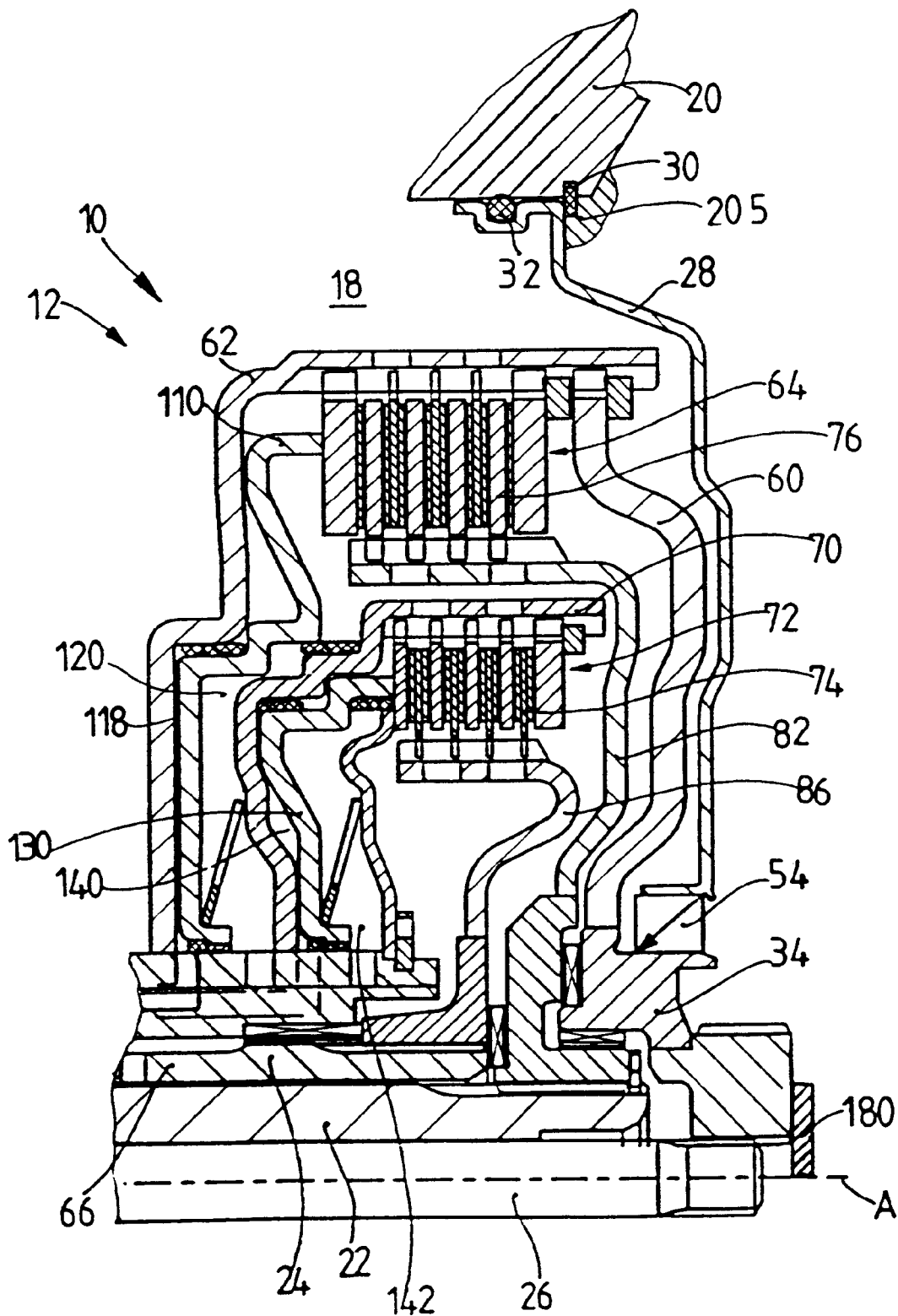
FIG. 9 shows sealing of the clutch space with a sealing compound.
Figure 10:
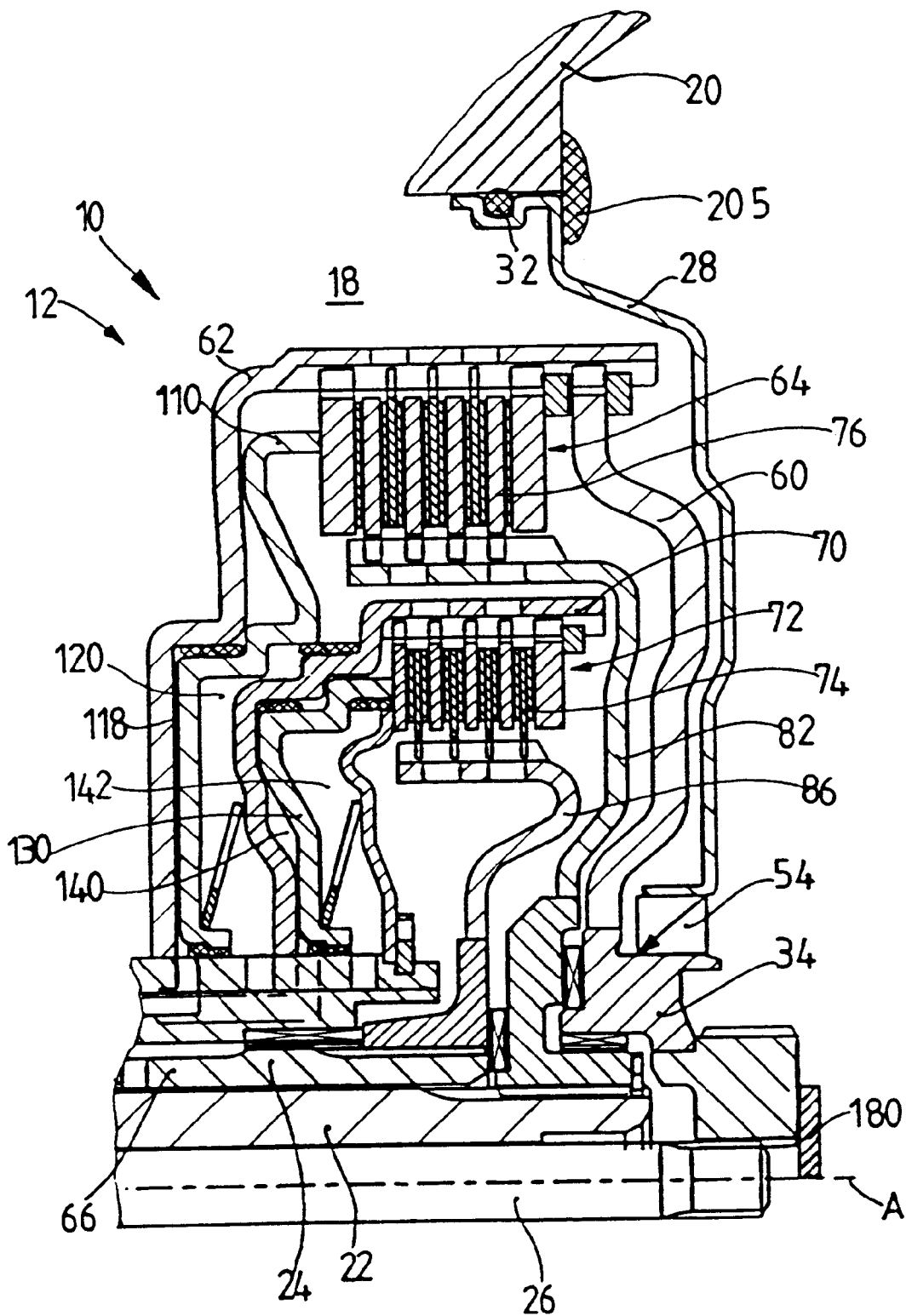
FIG. 10 a further manner of sealing the clutch space using sealing compound.

An excellent sealing of the clutch space is achieved by means of the solutions realized in the embodiment examples in FIGS. 9 and 10. In these embodiment examples, a sealing compound 205, for example, a sealing foam 205 (or alternatively an elastomer or the like), was sprayed on the sealing joint between the lid 28 and the housing 20 after mounting the lid 28. This foam 205 (or, generally, this sealing compound 205) can additionally take over the function of axially securing the lid 28 (the snap ring 30 of the embodiment example in FIG. 9 can accordingly possibly be dispensed with). Further, the foam 205 can dampen oscillations with axial relative movements and/or radial relative movements between the lid 28 and the housing 20.

Figure 6:
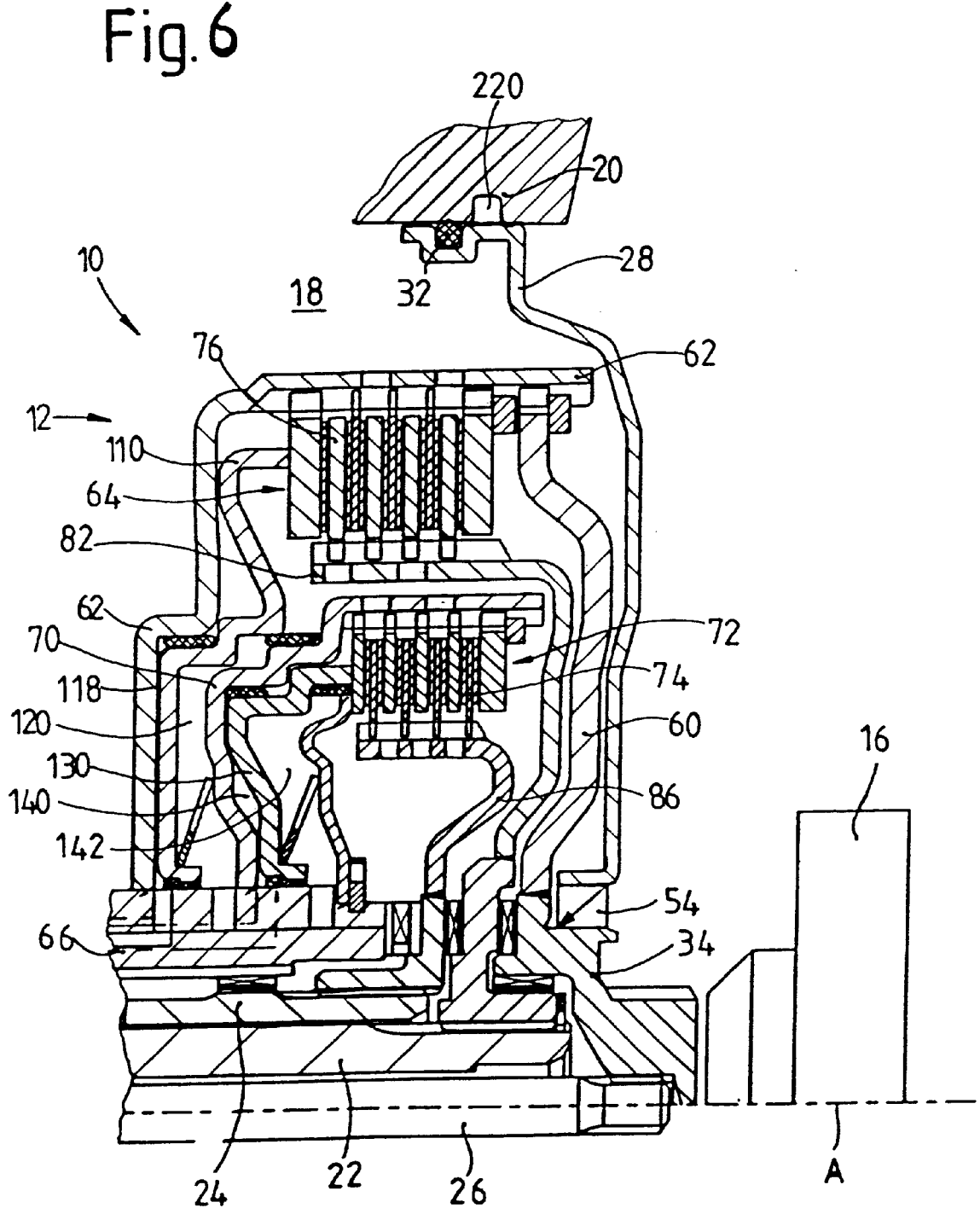
FIG. 6 is a view depicting an oil drain channel provided in the clutch housing.
Figure 8:
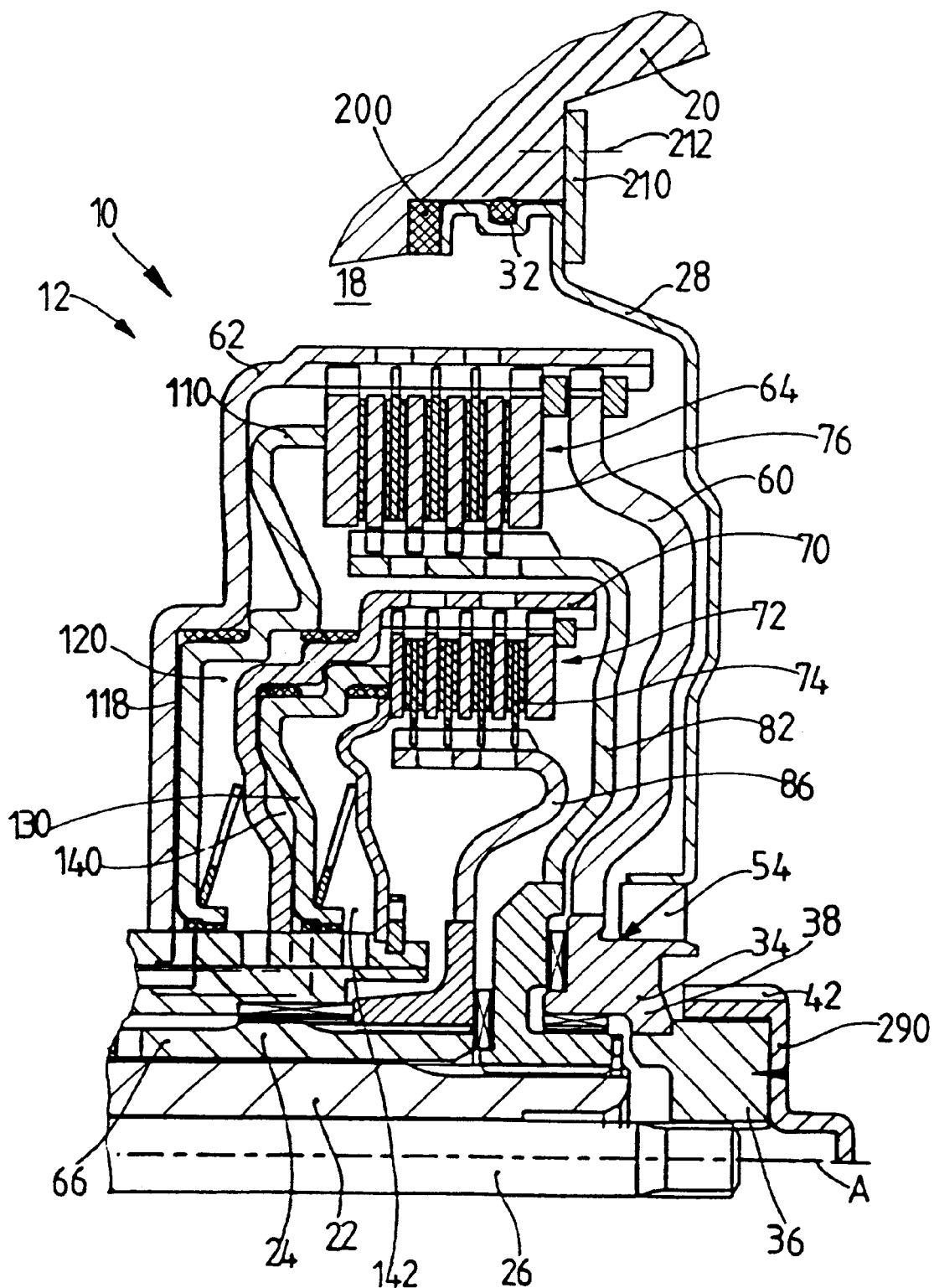
FIG. 8 depicts sealing of the lid with the clutch housing with an annular ring element of rubber or plastic as well as use of an annular securing plate for axially securing of the ring element.

In order to bring any residual leakage under control, for example, when it is desirable to make do with a particularly simple sealing arrangement, e.g., only one O-ring, an oil drain formed by a channel 220 can be provided in the clutch housing 20 corresponding to the embodiment example in FIG. 6. It is sufficient when the channel 220 is provided only in a lower area of the clutch housing; that is, it need not be formed all around. The channel 220 can be connected with a collecting reservoir. In some cases, it is also sufficient when the channel is only emptied via a drain at intervals in the course of regular maintenance.

As regards a wet clutch arrangement or wet clutch arrangements, another location to be sealed is located on the radial inside between the input side (hub 34) of the clutch device and the lid 28. Since the lid 28 is stationary and the hub 34 rotates when the drive unit is running, a correspondingly effective sealing arrangement 54 which withstands the rotation of the hub 34 relative to the lid 28 without excessive wear should be provided; in addition, this sealing arrangement 54 can function as a bearing under certain circumstances. Similar to the embodiment example in FIG. 1, the sealing arrangement 54 is secured axially in the embodiment examples of FIGS. 3, 9 and 14 by means of a bent lid edge portion or "overhang" (FIG. 3, FIG. 14) or pressed material at the lid edge (FIG. 9). The lid 28 can be slit in the area of the overhang. Otherwise, the part of the lid in the radial area of the sealing arrangement 54 should at least be closed in order to prevent leaks as far as possible.

An important aspect is the bearing support of the clutch device in the drivetrain. The clutch device is preferably supported axially and radially at the transmission input shafts 22 ad and 24 and not at all or, at most, only secondarily (for example, with the intermediary of the lid 28 and/or a connection sleeve receiving the ring part 66) at the transmission housing. In this 130 way, the tolerances that must be met by the transmission housing in the area of the housing cover 70 18 and by the clutch device (double-clutch 12) are not as strict. Bearings which serve as both axial and radial bearing support are preferably used. Reference is had to the bearings 68 in the embodiment examples of FIGS. 1, 3 and 11. The axial and radial bearings, which may be called compact bearings depending on the construction, can be constructed so as to allow the cooling fluid, in this case, the cooling oil, to flow through them and accordingly enable the advantageous supply of oil between the ring part 66 on the one hand and the transmission input shafts 22, 24 on the other hand.

A further aspect relates to the guiding of the actuating pistons 110 and 130. As has already been described in connection with the embodiment example in FIG. 1, the actuating piston 110 of the first plate clutch arrangement 64 having the radial outer plate stack 76 is guided so as to be displaceable at the first outer plate carrier 62 and at the second outer plate carrier 70. This twofold guiding at both the first and second outer plate carrier is especially useful particularly when the actuating piston, as in the embodiment examples shown here, acts at the plate stack 76 by a portion 230 (FIG. 2) which projects radially outward relatively far from the radial area of the first pressure chamber 118 and which accordingly has a relatively long effective lever arm. The counterforces of the plate stack exerted on the actuating piston 110 via the lever arm 230 can accordingly be safely carried off into the outer plate carrier without deformation of the actuating piston 110, which could lead to self-locking. As regards the second actuating piston 130, deformations of this kind are of less concern when—as in the embodiment examples shown herein—the portion of the actuating piston 130 projecting toward the second plate stack 74 projects less far radially and consequently no significant "force amplification" occurs due to an effective lever arm. An additional guiding of the second actuating piston 130 corresponding to the guiding of the first actuating piston 110 at the second outer plate carrier 70 is achieved likewise with the intermediary of the seal 136 at the wall portion 132 (compare FIG. 1).

An important aspect is the sealing of the pressure chambers and the pressure compensation chambers. With respect to pressure compensation chamber 142, an extremely advantageous construction of the sealing element 136 is realized in the embodiment example in FIG. 2. The sealing element 136 is constructed as a curved sealing element 136' which is placed over the plate part forming the wall 132 at the radial outer edge or is injection-molded on this edge. This construction of the sealing element 136' facilitates assembly in particular and, as a result, the sealing element 136' is secured axially to the edge of the wall portion 132, that is, it does not move along with the actuating piston 130.

Figure 2:
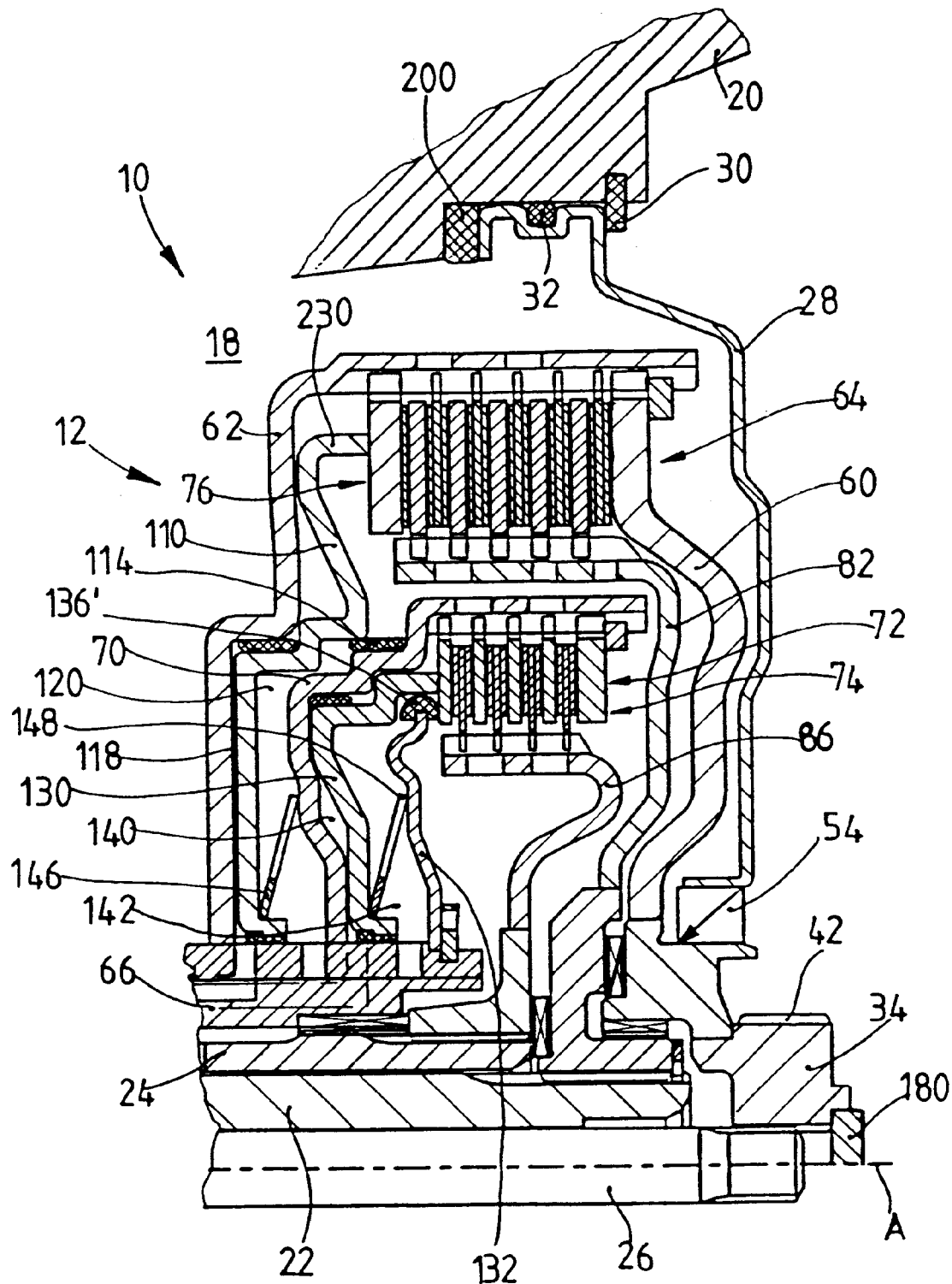
FIG. 2 is a view similar to FIG. 1 depicting a modified seal with which the lid is sealed to the clutch housing.

The sealing element 136' in FIG. 2 can have an axial dimensioning such that it acts at an associated portion of the second actuating piston 130 when the second plate clutch arrangement 72 is engaged and acts as a spring element which reinforces the opening of the second plate clutch arrangement 72, that is, which pretensions the actuating piston 130 in the direction of a release position. Also, the seal 114 acting between the second outer plate carrier 70 and the first actuating piston 110 can be constructed in a corresponding manner, so that the releasing movement of the first actuating piston 110 is also reinforced by the seal 114. Concerning the second actuating piston 130, its releasing movement can also be supported alternatively or additionally by the wall portion 132 which can be constructed so as to be elastically deformable for this purpose. By reinforcing the releasing movements of the actuating piston, the plate clutch arrangements respond quicker as regards disengagement than would be the case if only the diaphragm springs 146 and 148 (FIG. 1) were provided. With reference to FIG. 2, both diaphragm springs are arranged in the respective pressure compensation chamber 120 or 142.

As an alternative to the construction of the sealing elements as ring elements extending essentially in axial direction in cross section, FIGS. 7c and 7d show the alternative constructions of the double-clutch 12 in the area marked 'x' in FIG. 7a. According to the constructional variants shown in FIG. 7c, annular grooves 240 are worked into the outer plate carrier 62 (and/or alternatively or additionally—into the piston 110); these annular grooves 240, together with an associated surface of the other respective part (piston or outer plate carrier), form a labyrinth seal. Sealing elements made of plastic, rubber or the like can then be dispensed with. This is particularly advantageous inasmuch as the two elements engaging with one another in a sealing manner can have the same thermal expansion coefficient. In this way, no substantial changes in the friction between the elements in sealing engagement with one another and no noteworthy deterioration in sealing action, possibly leakage, occurs in the event of changes or fluctuation in temperature.

Another possibility for constructing the seals is shown in FIG. 7d. Instead of the sealing ring 112 in FIG. 7a, which extends primarily in axial direction in cross section, a sealing ring 112' is provided according to FIG. 7d which extends predominantly in radial direction in cross section and which is inserted in a shaped portion 250 of the first actuating piston 110. The sealing element 112' acts at an inner circumferential surface of the first outer plate carrier 62 in the manner of a wiper or stripper. The sealing element 112' is tensioned between the inner circumferential surface of the outer plate carrier 62 and a base of the shaped portion 250 of the actuating piston 110 in such a way that the curvature of the sealing element 112' shown in FIG. 7d results in the disengaged state of the first plate clutch arrangement 64. When the first plate clutch arrangement is engaged, the sealing element 112' is relaxed and stretched (in cross section). Accordingly, maximum advantage is taken of the sealing engagement of the sealing element 112' in the state shown in FIG. 7d, that is, when the actuating piston 110 is in its end position corresponding to a disengaged plate clutch arrangement. On the other hand, in contrast to the construction shown in FIG. 7d, it is preferable that the sealing engagement of the respective sealing element is made use of to the maximum when the clutch is engaged. For this purpose, instead of sealing element 112', a sealing element 112" shown in a detail in FIG. 7d can be inserted into the shaped portion 250, this sealing element 112" being curved in the opposite direction to that of sealing element 112' in the relieved state in which it is not yet inserted. In this way, the sealing element 112" is subjected to increasing stretching and accordingly an increasing sealing engagement by the pressure in the pressure space 118 and by the axial movement of the actuating piston 110 for the purpose of engaging. A stretched tension state of the sealing element 112", shown as another detail in FIG. 7d, is reached in the course of the engaging movement of the first actuating piston 110, possibly not until its axial end engagement position, and can be attributed above all to the influence of pressure in the pressure chamber 118 on the sealing element 112" which additionally presses the sealing element into the shaped portion 250. A particularly effective sealing of the pressure chamber 118 is accordingly achieved, specifically, in the engaged state above all or in the course of the engagement of the associated plate clutch arrangement 64. It is extremely useful to provide maximum sealing action in the state of the actuating piston in which it occupies its axial end engagement position, that is, when the plate stack 76 is compressed to a maximum and maximum pressure prevails in the pressure chamber 118. If possible, leakage should not occur especially in this operating situation.

A further advantage of the possible construction shown in FIG. 7d for area x in FIG. 7a (the same applies for the rest of the seals associated with the actuating piston) is chiefly that axial installation space is economized on because a one-sided groove is sufficient and the groove depth can extend in a radially extending portion of the actuating piston 110 (or, alternatively, of the outer plate carrier). Accordingly, small wall thicknesses are possible. The groove forming the shaped portion can be produced simply, for example, by rolling.

Figure 5:
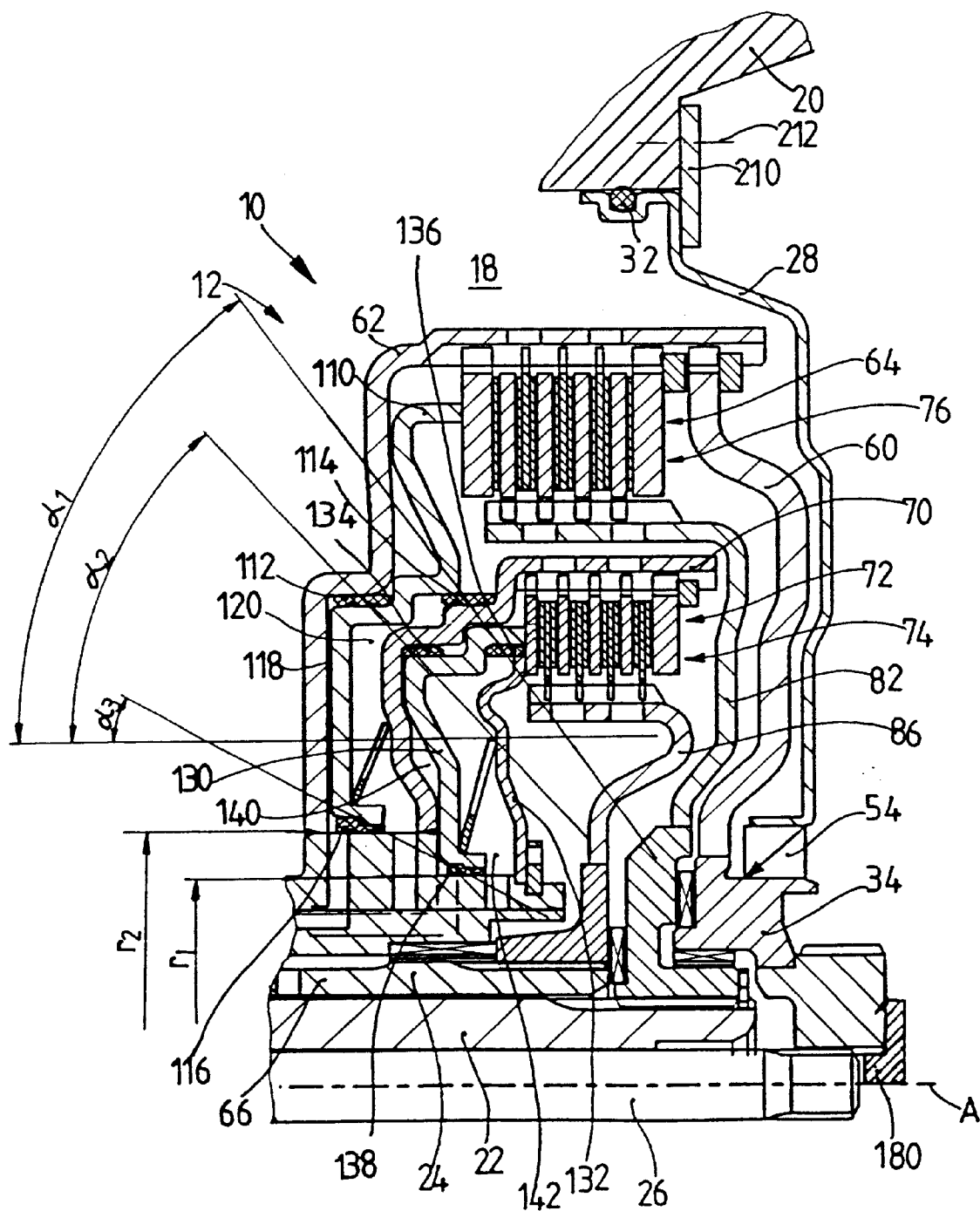
FIG. 5 depicts an advantageous manner of arranging sealing elements in the double clutch to provide a more compact contraction.
Figure 13:
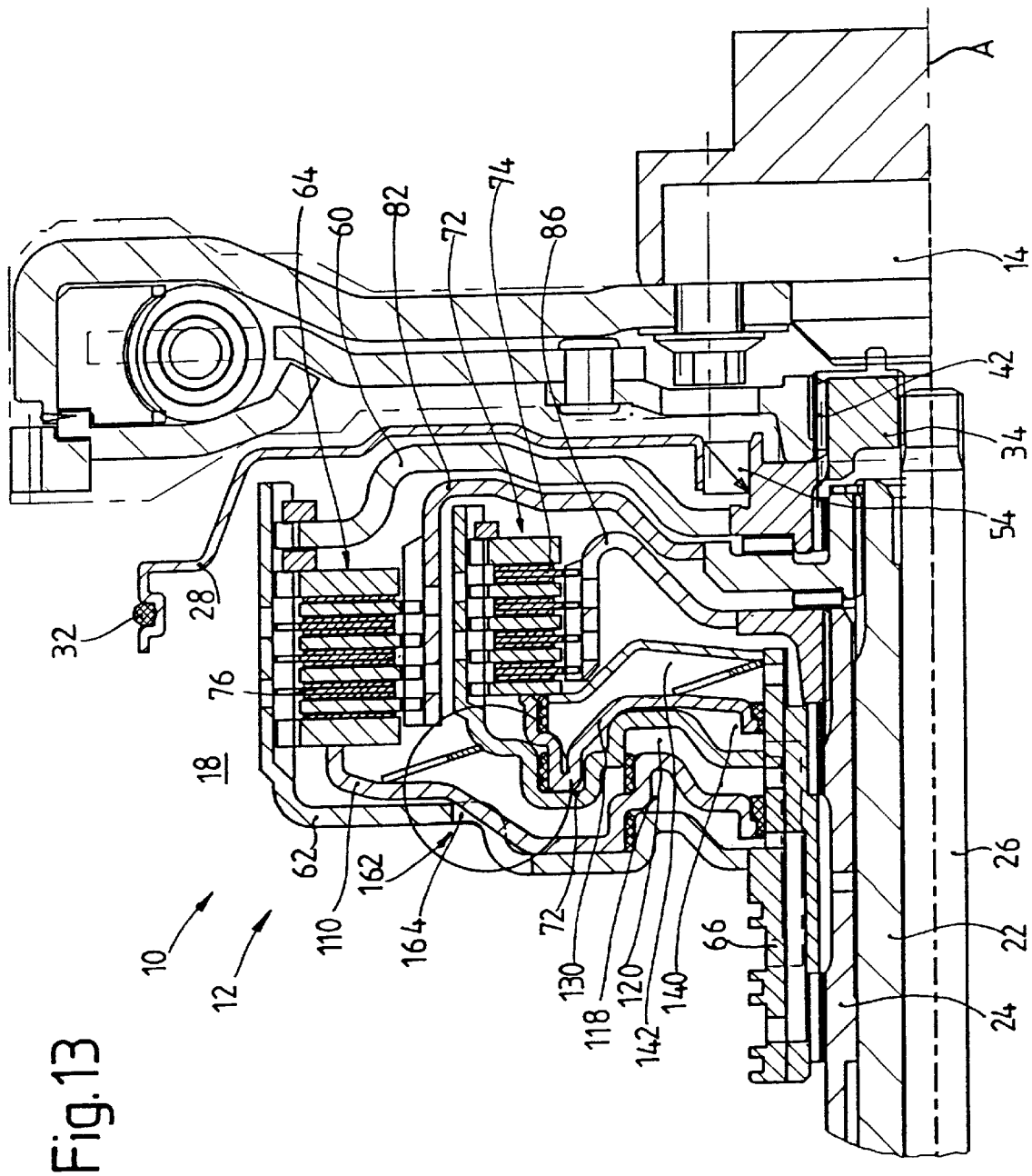
FIG. 13 illustrates how the clutch device is coupled to the drivetrain via a clutch hub, that is, preferably via a torsional vibration damper.
Figure 14:
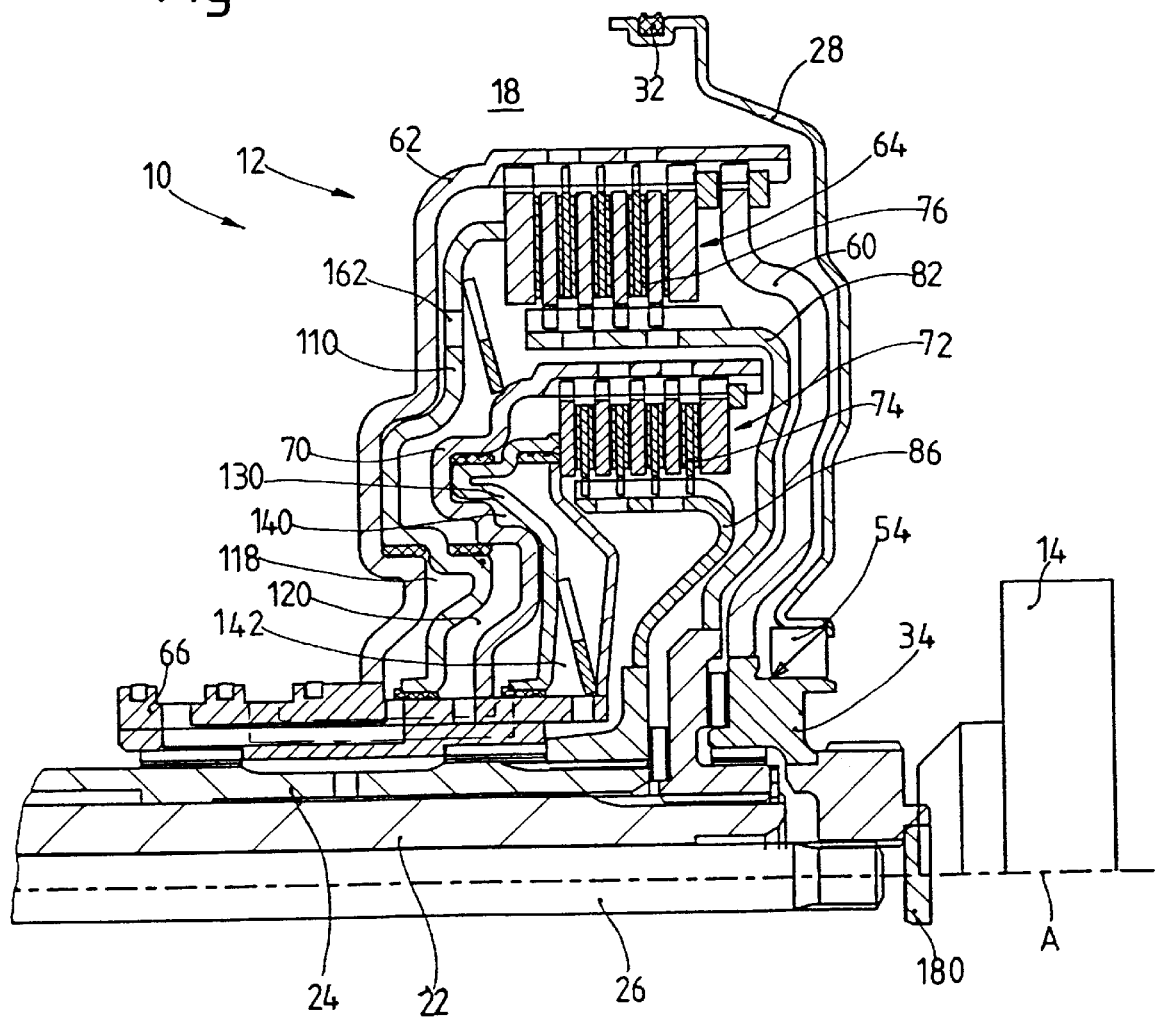
FIG. 14 shows a hub sealing arrangement.

The type of arrangement of the actuating piston and especially of the seals associated with it has an effect on the axial and radial installation space needed. An important parameter in this connection is that of the angles $\alpha_1$, $\alpha_2$ and $\alpha_3$ shown in FIG. 5 which amount to approximately 55° ($\alpha_1$), approximately 45° ($\alpha_2$) and approximately 25° ($\alpha_3$) in the embodiment example in FIG. 5. The angles between a horizontal line parallel to axis A and the straight lines intersecting seals 114 and 136, seals 112 and 134 and seals 116 and 138 are defined as angles $\alpha_1$, $\alpha_2$ and $\alpha_3$. It has been shown that an arrangement of the seals in an angular area corresponding to an angle $\alpha_1$, $\alpha_2$ or $\alpha_3$ of approximately 10° to 70° is advantageous with respect to the compactness of the double-clutch 12. Angles $\alpha_1$ and $\alpha_2$ are particularly important in this respect. It is apparent from FIG. 5 that it is not required that seals corresponding to one another must run on the same diameter or radius. Rather, it can be extremely advantageous, for instance, with respect to compactness, to arrange these seals on different diameters or radii (radii $r_1$ and $r_2$ associated with seals 116 and 138 are indicated in FIG. 5). This can also be contributed to in particular in that the effective piston surface of the first actuating piston 110 is smaller than the effective piston surface of the second actuating piston 130 so that the actuating pressures occurring in the pressure chambers 118 and 140 are adapted to one another. This is because, as a rule, both clutch arrangements must transmit the same torque, but the second plate clutch arrangement requires a greater contact pressing force for this purpose because the average friction radius of its plate stack 74 is smaller than the plate stack 76 of the first plate clutch arrangement 64. Another possibility for providing the second actuating piston 130 with a greater effective pressure surface subjected to the pressure medium in the pressure chamber than the first actuating piston 110 is shown in FIG. 13. Additionally, reference is had to the remarks pertaining to the embodiment example in FIG. 1.

Figure 11:
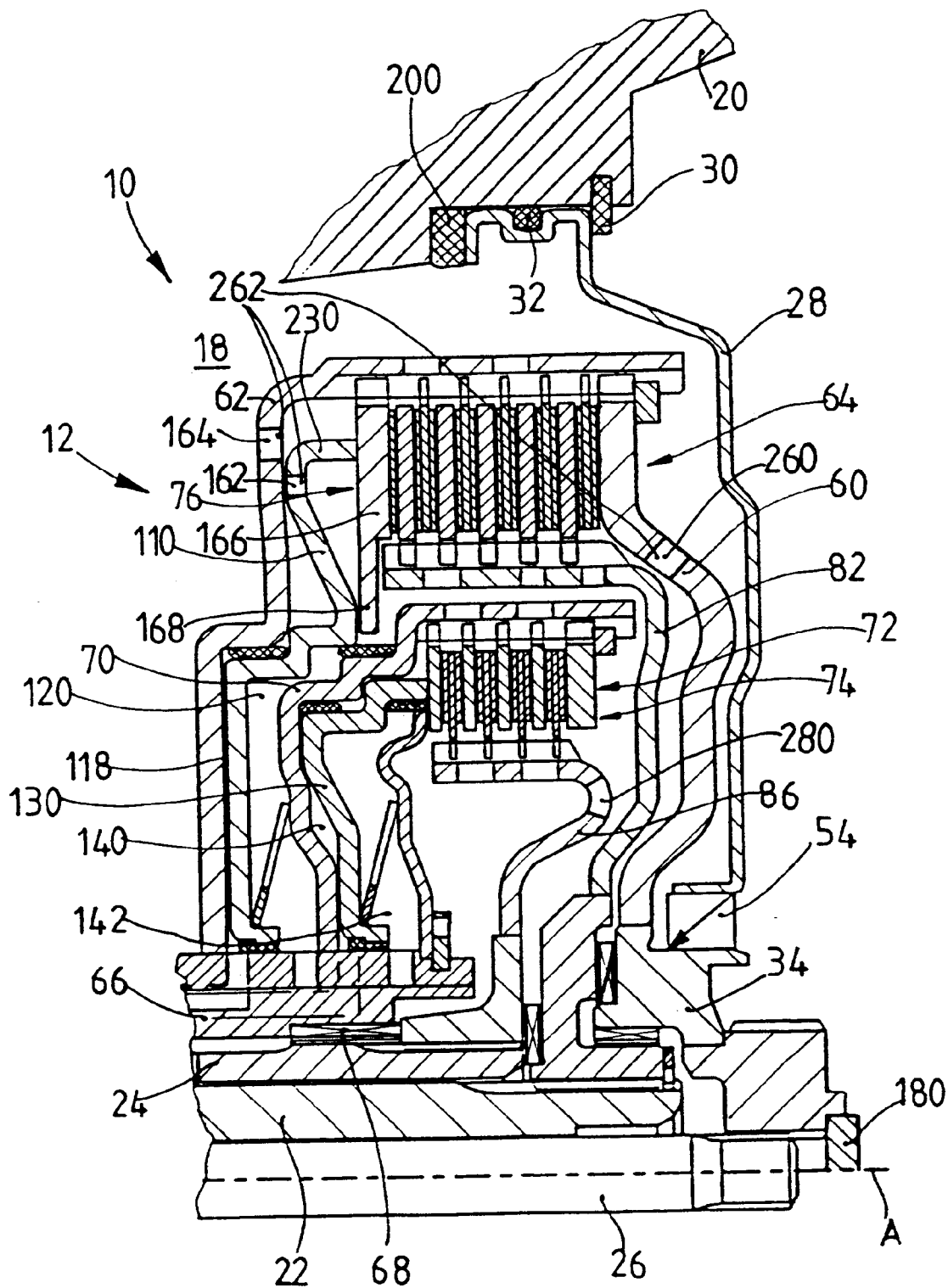
FIGS. 11 and 12 show further aspects of the clutch construction.

Regardless of the construction of the clutch device in particular, it is important in wet clutch arrangements to prevent unwanted effects of the cooling fluid, especially the utilized cooling oil or the like. Accordingly, as was already mentioned with respect to the embodiment example in FIG. 1, unwanted effects of the centrifugal force pressure of the oil can be reduced by openings (such as bore holes) in the plate carriers and/or actuating pistons. Accordingly, deformations of the plate carriers in particular, which can result in checking or impairment of the piston movement, can also be prevented. With respect to providing openings 162 and 164 in the piston 110 and in the outer plate carrier 62 (compare FIG. 11), the construction of the adjacent end plate 166 as a conducting element with a conducting portion 168 is particularly useful in order to provide for a sufficient volume flow through the plate stack 76 in spite of the flow-off possibility for the cooling oil through the openings 162 and 164. A corresponding through-flow opening 160 is also provided in the carrier plate 60 in the embodiment example of FIG. 11. In FIG. 11, the openings 162, 164 and 260 are designated in their entirety as a centrifugal force pressure reduction device 262 of the first plate clutch arrangement 64.

In the embodiment example of FIG. 13, the first outer plate carrier 62 and the first actuating piston 110 are constructed in a special manner with respect to the cooling oil outlet openings 162 and 164 so as to economize on axial space in the area of the outer plate carrier 72 of the second (inner) plate clutch arrangement on the one hand and, if desired, to prevent rotation of the first actuating piston 110 relative to the outer plate carrier 62 on the other hand. For this purpose, the first outer plate carrier 62 and the first actuating piston 110 are partially recessed alternately in the circumferential direction, so that locations of the actuating piston 110 that are not recessed engage in recessed locations of the outer plate carrier 62 and locations of the outer plate carrier 62 that are not recessed engage in recessed locations of the actuating piston 110. It is useful to provide the aforementioned protection against rotation insofar as additional loading of the seals acting between the outer plate carrier 62 and the actuating piston 110 through microrotation due to engine unevenness can be prevented. In order to achieve this protection against rotation, the actuating piston 110 and the outer plate carrier 62 must also engage with one another in the engaged state of the first plate clutch arrangement 64, which would not be necessary otherwise.

Concerning the centrifugal force pressure compensation achieved at the actuating piston itself by the pressure compensation chambers, the pressure chamber associated with an actuating piston and the pressure compensation chamber associated with this actuating piston extend along the same radial area in the embodiment examples in FIGS. 2 to 14, so that fill level limiting means, for example, in the form of a fill level limiting opening 156 of the pressure compensation chamber 142 of the embodiment example in FIG. 1, are not required. In general, it should be noted with respect to the centrifugal force compensation at the piston that the pressure chamber seals and the pressure compensation chamber seals need not necessarily have the same radius. It matters only that the pressure difference between the pressure chambers and the associated centrifugal force pressure compensation chambers caused by centrifugal force does not exceed a maximum value and preferably approaches zero. Apart from the outer diameter of the piston chambers which is determined by the radial outer seals, the pressure difference also depends on the inner diameter of the piston chambers determined by the radial inner seals and can accordingly be influenced by means of this. The filling level limiting means already mentioned can be provided in addition if required.

Figure 3:
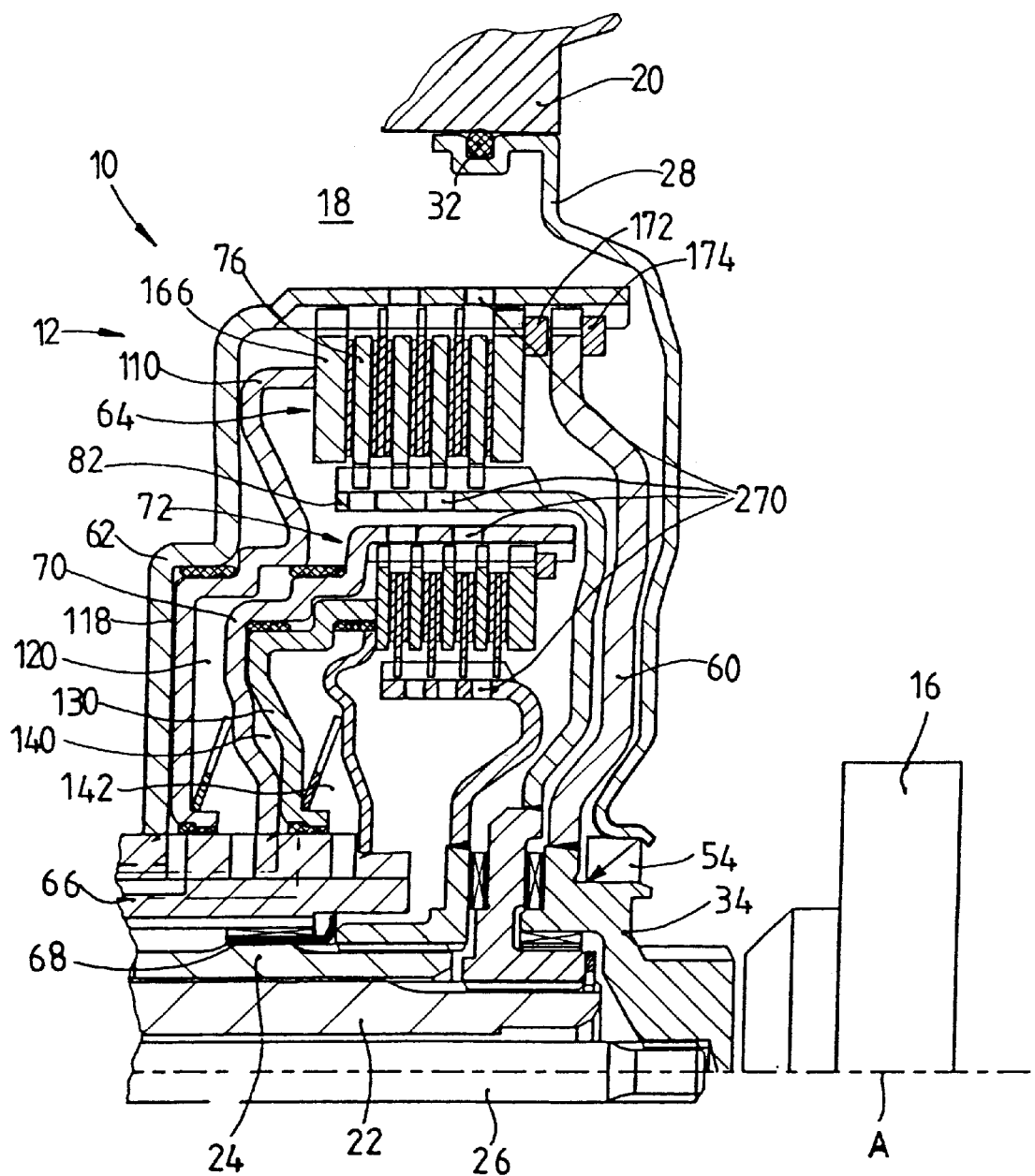
FIG. 3 is a view similar to FIG. 1 showing another form of seal of the lid to the clutch housing.
Figure 4:
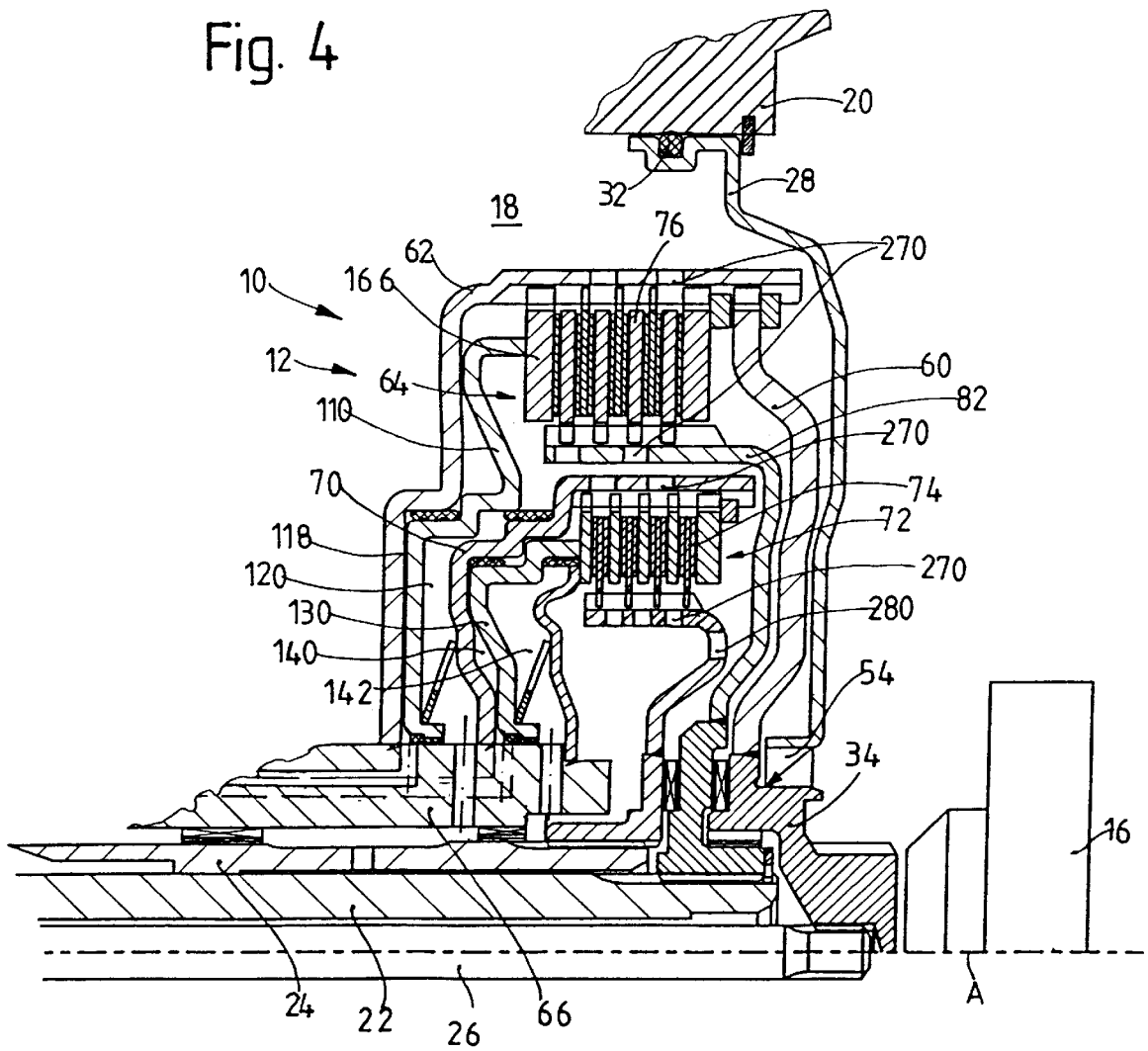
FIG. 4 is a view of a variant of the double clutch construction of FIG. 3.

An important subject pertains to controlling the output losses occurring in the multiple-clutch device, or double-clutch device, as the case may be, in frictional engagement operating situations of a respective clutch arrangement, especially also in the case of slip operation of the clutch arrangement. For this purpose, it is extremely useful to form the clutch arrangements as wet-type plate clutch arrangements as is the case in the embodiment examples of FIGS. 1 to 14. For an effective through-flow through the plate stacks 74 and 76 and, therefore, for an effective dissipation of friction heat, through-openings which are associated with the respective plate stack and designated in their entirety by 270 in FIGS. 3 and 4 are preferably provided in the plate carriers. With respect to plate stacks which have metal plates (usually steel plates) without facings and plates with facings, the through-openings 270 are preferably arranged in such a way that the cooling fluid, in this case, the cooling oil, flows directly past the steel plates at least in the engaged state of the respective plate clutch arrangement. This applies especially when insulating materials such as paper material are used as friction facings because then virtually the entire heat capacity of the plate stack is provided by the steel plates.

It is not necessary for the through-openings 270 in the respective inner plate carrier 82 or 86 and the through-openings in the outer plate carrier 62 or 70 to be located directly opposite one another or, as the case may be, to be aligned. Rather, the flow path of the cooling oil between the inner plate carrier and the outer plate carrier is advisably lengthened by an axial displacement of the through-openings relative to one another, so that the oil remains in the area of the plate stack longer and has more time for heat absorption of the steel plates and from the shear gap between plates which can be brought into frictional engagement with one another.

In this connection, it should be noted that it is particularly advisable when the oil flowing through the plate stacks has a releasing effect on the plates and accordingly reinforces a fast release of the respective plate clutch arrangement. For this purpose, an effective oil flow between the plate stack and the axially extending ring portion of the outer plate carrier 62 and 70, respectively, and/or the inner plate carrier 82 and 86, respectively, which exerts a dragging effect on the plates is preferably made use of by means of corresponding arrangements of the through-openings 270 and by providing the possibility for the oil to flow axially out of the area of the plate stack in the direction of the actuating piston (in connection with impeding or suppressing an axial flow of oil out of the area of the plate stack in the opposite direction toward the carrier plate 60).

The majority of output losses occur during startup at the clutch arrangement which is used as starting clutch. Therefore, it must be ensured that the clutch arrangement serving as starting clutch is cooled in a particularly effective manner. If the first plate clutch arrangement 64 having the radial outer plate stack 76 serves as starting clutch, as is preferred, then it is advisable to guide a large portion of the oil volume flow past the inner clutch arrangement 72. For this purpose, as is shown in FIGS. 4 to 11, the second inner plate carrier 86 can be formed with through-openings 280 to enable oil to flow past the plate stack 74 radially outward to the plate stack 76. The inner plate carrier 82 of the outer plate clutch arrangement 64 then preferably serves as a baffle for the oil flow, so that at least the predominant portion of the oil flowing through the through-openings 280 reaches the through-openings 270 in the inner plate carrier 82 which are associated with plate stack 76. In this connection, the construction of the end plate 166 with the conducting portion 168 is also particularly useful, since this ensures that the oil flowing to the through-openings 270 in the inner plate carrier 280 at least predominantly passes through these through-openings and flows through the plate stack 76.

For better control of the friction heat occurring during starting or during slip operation, the heat capacity of the respective clutch arrangement, especially the first clutch arrangement 64, can be increased by various measures. Accordingly, it is possible to increase the number of plates for this clutch arrangement, in this case, the first radial outer clutch arrangement, relative to the number of plates in the other clutch arrangement. Accordingly, in the embodiment examples in FIGS. 2, 11 and 12, the first (outer) clutch arrangement 64 has more plates than the inner (second) clutch arrangement 72. It was recognized that the advantages with respective to the increased heat capacity of the plate stack 76 justified the greater input of material, implied by the different number of plates, for the production of the plates of the two clutch arrangements. A further possibility is to produce at least some of the friction facings from a heat-conductive material. For example, the sintered facings mentioned in connection with the embodiment example in FIG. 1 can be used. Accordingly, for example, in the embodiment examples in FIGS. 3 to 10 and 13, the axial outer plates (end plates) having the facings, that is, the outer plates on the axial outer side, are outfitted with friction facings of sintered material. Because of the high thermal conductivity of the sintered facings, these end plates can be effectively utilized for storing output losses, especially starting output losses. These end plates are constructed so as to be comparatively thick axially for a particularly high heat capacity. Reference is had to the constructions for the embodiment example in FIG. 1.

Figure 12:
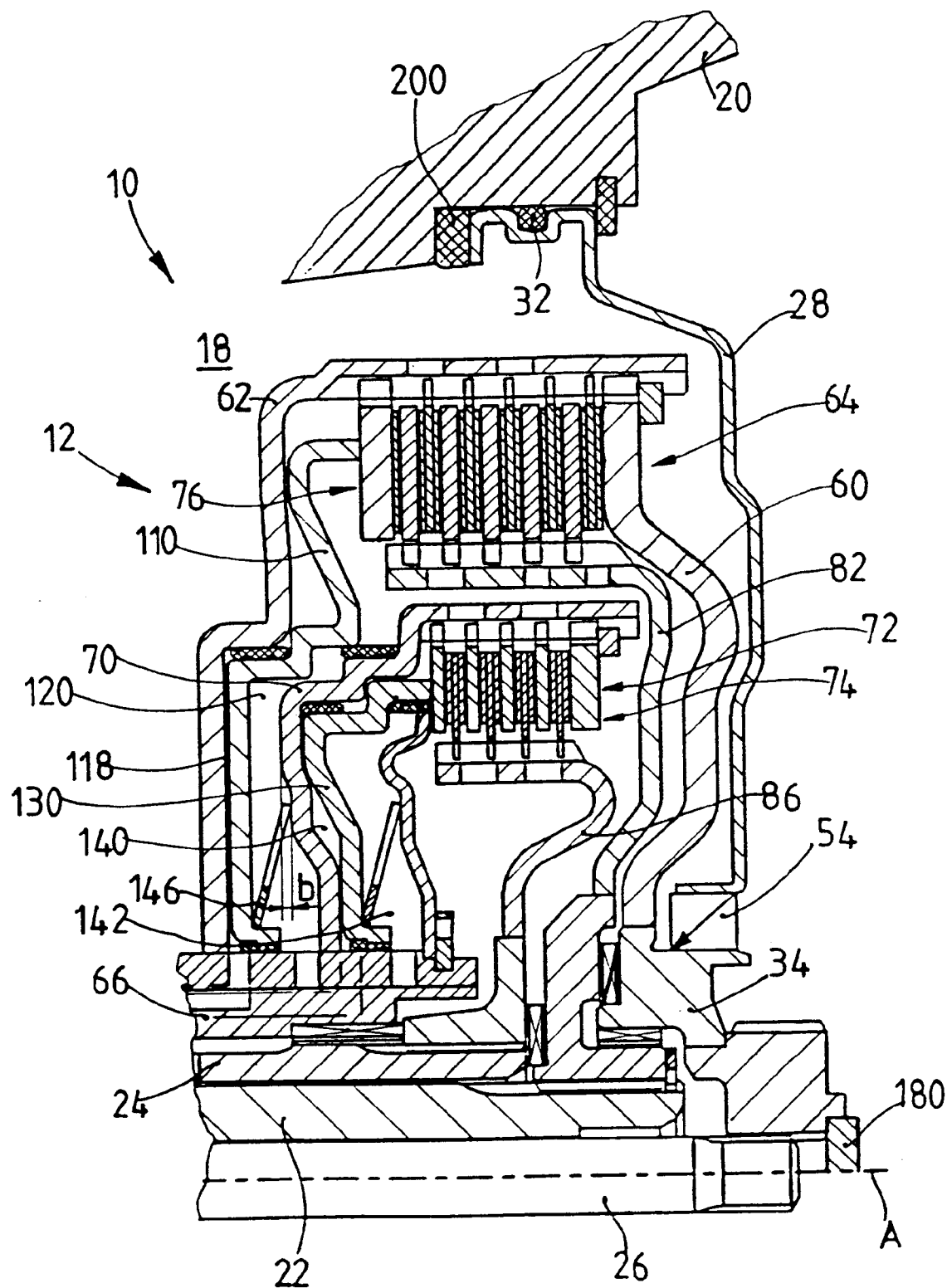

A further possibility for increasing the available heat capacity consists in the use of the carrier plate 60 as a friction surface of the plate stack as is the case in the embodiment examples in FIGS. 2, 11 and 12. The carrier plate 60 has a substantially greater mass than an individual plate and, consequently, a substantially greater heat capacity and can accordingly temporarily store a larger amount of friction heat. Further, the carrier plate has a large surface at which it can interact with cooling oil, so that the buffered heat can be effectively carried off from the carrier plate 60 by the cooling oil.

A difference between the embodiment example in FIG. 11 and the embodiment example in FIG. 12 consists in that the plate which has a facing and which is located on the furthermost right-hand side in the plate stack 76, for example, a paper plate, is shorter in the radial direction (radially inward) in the embodiment example in FIG. 12 than in the embodiment example according to FIG. 11. The reason for this step is that an uneven area pressure of plates having facings can lead to problems, for example, facing separations. In the case of the embodiment example in FIG. 11, there is a risk of an uneven area pressure of the facing-carrying outer plate directly adjacent to the carrier plate 60 because the friction surface of the carrier plate associated with the plate passes into a rounded transitional surface region in which the plate is no longer adequately supported axially. Of course, the radial dimensions of the friction surface of the carrier plate could also be increased to the point that the adjacent plate is uniformly supported at every point. As a result of this, however, more radial installation space would be required. On the other hand, the solution in FIG. 12 is preferred. In this case, the outer plate which is directly adjacent to the carrier plate 60 and which can be brought into frictional engagement with the friction surface of the carrier plate 60 is constructed so as to be shorter radially and accordingly has a smaller inner radius than other outer plates and consequently has a smaller average friction radius than other outer plates. The radial dimensioning of this outer plate is adapted to the radial dimensioning of the friction surface of the carrier plate 60 in such a way that the friction surface of the carrier plate 60 is substantially flat in the radial area of the outer plate. The rest of the plates (outer plates) having facings can have larger radial dimensions than the plate with facing (outer plate) directly adjacent to the carrier plate 60 because the adjacent, axially outermost inner plate (steel plate) provides for a uniform area pressure over the larger friction facing surface as well. Other plates with facings in the plate stack can also differ with respect to their average friction radius for making the area pressure more uniform, that is, they can have somewhat different inner radii in the case of outer plates. In this way, temperature profiles which specifically protect against a deformation of the steel plates due to heat can be adjusted in the steel plates not having facings. Further, it is possible by means of corresponding temperature profiles to deliberately adjust deformations of steel plates caused by heat which compensate for deformations of other steel plates caused by heat, so that the area pressure is rendered uniform overall.

As concerns providing friction facings of different material in a plate stack, it has already been noted in connection with the embodiment example in FIG. 1 that the curve of the coefficient of friction can be adjusted in this way between progressive, neutral and degressive. A progressive or at least neutral curve of the coefficient of friction is preferred in order to counter a buildup of torsional vibrations in the drivetrain and, to this extent, torsional vibrations do not pose a problem because, for example, special steps have been taken to damp or suppress torsional vibrations. Accordingly, it is certainly possible to produce all of the friction facings of a plate stack from sintered material so that all of the plates having friction facings, with their heat capacity, are available as heat buffers.

It has already been mentioned that the two diaphragm springs 146 and 148 (compare FIG. 2) are arranged in the respective pressure compensation chambers (120 and 142) in the embodiment examples in FIGS. 2 to 12 so as to make good use of the available installation space. According to the embodiment example in FIG. 12, the outer plate carrier 70 has a step with height b at the radial outer side of the diaphragm spring 146 which serves as an end stop for the actuating piston 110. The step height b is adapted to the thickness of the diaphragm spring 146, so that the diaphragm spring is prevented from bending in the direction opposite to that shown in FIG. 12 due to the actuating piston 110 traveling to the right. Therefore, a flat contact face for the diaphragm spring 46 at the inner plate carrier 70 is not required, so that the inner plate carrier 70 can be designed with respect to its cross-sectional shape in a useful manner for purposes of minimizing the required installation space.

In all of the embodiment example of FIGS. 1 to 14, the clutch device is coupled to the drive unit of the drivetrain via the clutch hub 34, that is, preferably via a torsional vibration damper as is shown in the example in FIG. 13. Further, a pump drive shaft 26 is provided as the radially innermost shaft in all of the embodiment examples in FIGS. 1 to 14, this radially innermost shaft being coupled to the clutch hub 34 via teeth. In this connection, reference is had to the comments regarding the embodiment example in FIG. 1.

For technical reasons pertaining to manufacture, the hub is preferably constructed in two parts (ring portions 36 and 38 of the hub in FIG. 1). In the embodiment examples in FIGS. 2, 5, 8, 9, 10, 11, 12, 13 and 14, the hub 34 is also constructed in two parts in a corresponding manner, while the hub 34 is constructed in one piece in the embodiment examples in FIGS. 3, 4, 6 and 7.

Further for technical reasons pertaining to manufacture, it is preferred that the hub is constructed as a ring part opening toward the drive unit, so that the internal toothing of the hub associated with the pump drive shaft 26 can be cleared easily. The opening of the hub can be advantageously closed by means of a sealing element, for example, a sealing journal 180 corresponding to FIG. 5. The sealing journal 180 can be centered by the internal toothing of the hub 34 and welded to the hub. Another possibility is realized in the embodiment example in FIG. 8. In this case, a closure plate part 290 welded to the hub 34, or, more precisely, to the ring portion 36 of the hub, is provided in place of a sealing journal or the like and has the external toothing 42 associated with the torsional vibration damper (not shown) at a flange portion. The closure plate part 290 can have a journal-like portion for self-centering of the plate part 290 at the hub 36. Alternatively or additionally, the plate part 290 can have a journal-like portion which serves for mutual centering of the engine shaft and transmission input shafts. The clutch hub 34 itself can also perform this function. In the embodiment example in FIG. 5, the hub 34 is constructed without an opening in the area of the internal toothing.

It should be added that the possibility of reinforcing a disengagement of the respective plate clutch arrangement mentioned in connection with the sealing element 136' and in connection with the flow of cooling oil through the plates is advantageous in many respects, for example, when the plate clutch arrangement in question is to be operated with regulated slip. Other components of the clutch device which are present in any case can also act in this way, for example, the wall portion 132 which defines the second pressure compensation chamber 142 and which can serve as a spring element pretensioning the associated actuating piston in the releasing direction, as was already indicated in the preceding.

Further details of the double-clutches 12 according to the different embodiment examples and especially differences between the various double-clutches will be readily discerned from the Figures by the person skilled in the art.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, at least one of the clutch arrangements having an actuating piston defining a pressure chamber for pressure medium actuation of the said one clutch arrangement, the actuating piston dividing the pressure chamber from an associated centrifugal force pressure compensation chamber holding a pressure compensation medium, a restoring spring arrangement for restoring the actuating piston from an actuating position thereof being carried in the centrifugal force pressure compensation chamber, an elastic sealing arrangement is associated with the pressure compensation chamber and a boundary wall of the pressure compensation chamber, said elastic sealing arrangement being engagable with the actuating piston in actuated position thereof and applying pretension to said actuating piston for reinforcing a release movement of said actuating piston during disengagement of the clutch arrangement.

2. Clutch device according to claim 1, in which the centrifugal force pressure compensation chamber of the at least one clutch arrangement is connected to a pressure compensation medium supply for supplying pressure compensation medium to the centrifugal force pressure compensation chamber during operation of the clutch device.

3. Clutch device according to claim 2, in which the pressure compensation medium supply comprises a separate operating fluid supply, said operating fluid supply supplying at least one other functional unit of the clutch device.

4. Clutch device according to claim 1, in which the sealing arrangement is a sealing element carried at a boundary wall portion of the pressure compensation chamber and positioned to engage tightly with said wall portion and said actuating piston.

5. Clutch device according to claim 4, in which the sealing element projects from the boundary wall portion in the direction of a stop face of the actuating piston and, at least in the engaged state of the clutch arrangement, transmits elastic restoring force to the actuating piston in a direction of a stroke position corresponding to a released state of the clutch arrangement.

6. Clutch device according to claim 5, in which the sealing element is injection-molded on at one of an edge area of the boundary wall portion and fitted over said edge and an area proximal thereto.

7. Multiple-clutch device, for installation in a drivetrain of a motor vehicle between a drive unit and a transmission, comprising a first clutch arrangement associated with a first transmission input shaft of the transmission, and a second clutch arrangement associated with a second transmission input shaft of the transmission for transmitting torque between the drive unit and the transmission, at least one of the clutch arrangements having an actuating piston defining a pressure chamber for pressure medium actuation of the at least one clutch arrangement, the at least one clutch arrangement being constructed as a plate clutch arrangement wherein a radial outer clutch annularly encloses a radial inner clutch arrangement, the actuating piston associated with the radial outer clutch arrangement being guided at an outer plate carrier of the radial outer clutch arrangement, and at an outer plate carrier, of the radial inner clutch arrangement so as to be axially displaceable to seal the pressure chamber, the actuating piston defining a centrifugal force pressure compensation chamber receiving pressure compensation medium, wherein the actuating piston is guided further at the plate carriers so as to seal the centrifugal force pressure compensation chamber, the centrifugal force pressure compensation chamber associated with the radial outer clutch arrangement being defined by the outer carrier of the radial inner clutch arrangement, another actuating piston associated with the radial inner clutch arrangement defines another pressure chamber and is guided to be axially displaceable at the outer plate carrier of the radial inner clutch arrangement and, at a wall of another centrifugal force pressure compensation chamber associated with said other actuating piston, and so as to seal the associated pressure chamber and the centrifugal force pressure compensation chamber which receives a pressure compensation medium, sealing elements cooperate with the actuating pistons of the at least one clutch arrangement and said another piston to seal the respective ones of the pressure chambers and the centrifugal force pressure compensation chambers, said sealing elements being arranged radially staggered and partially overlapping axially.

8. Clutch device according to claim 7, in which at least one centrifugal force pressure compensation chamber extends over a different radial area than its associated pressure chamber in such a way that an effective pressure application surface of an associated piston on a pressure chamber side thereof is smaller than an effective pressure application surface of the piston on a pressure compensation chamber side, a pressure compensation chamber limiting surface of the said associated piston extends farther radially outward than a pressure chamber limiting surface of the said associated piston, there being fill level limiting means in the pressure compensation chamber to limit the filling of the pressure compensation chamber with pressure compensation medium to a maximum radial filling level thereby to prevent centrifugal force overcompensation therein.

9. Clutch device according to claim 8, in which the fill level limiting means comprise at least one pressure compensation medium through-opening in a radially extending wall of the pressure compensation chamber.

10. Multiple-clutch device, for installation in a drivetrain of a motor vehicle between a drive unit and a transmission, which clutch device comprises a first clutch arrangement associated with a first transmission input shaft of the transmission, and a second clutch arrangement associated with a second transmission input shaft of the transmission for transmitting torque between the drive unit and the transmission, in which at least one of the clutch arrangements has an actuating piston defining a pressure chamber for pressure medium actuation of the said one clutch arrangement, the actuating piston being guided at one of a wall portion defining the pressure chamber and a wall portion defining an associated pressure compensation chamber so as to seal the pressure compensation chamber, wherein at least one sealing ring acts between the respective wall portion and the actuating piston, which sealing ring is secured to one of said actuating piston and said wall portion and acts on a other of said actuating piston and wall portion with axial play during an engaging movement and during a disengaging movement of the actuating piston such that sealing engagement of the sealing ring with the wall portion and actuating piston increases.

11. Clutch device according to claim 10, in which the sealing ring engages on one side in an annular groove in one of the actuating piston and the wall portion.

12. Clutch device according to claim 11, in which the sealing ring has at least one portion which acts at one of a surface region of the actuating piston and of the wall portion which extends in an engaging-disengaging direction of the actuating piston and which is planar in this direction.

13. Clutch device according to claim 12, in which the at least one portion of the sealing ring acts at the surface region in the manner of a stripper.

14. Clutch device according to claim 12, in which the sealing ring is curved in an axial direction in a state of lower tension with a looser sealing engagement with respect to a section plane co-directional with an axis of rotation (A) of the clutch device and is moved to a state of higher tension with a tighter sealing engagement during engaging and during disengaging movements of the actuating piston, wherein said sealing ring is stretched with respect to said section plane or less sharply curved in an axial direction.

15. Clutch device according to claim 14, in which the sealing ring is acted upon to the maximum sealing engagement in the engaged state of the respective clutch arrangement.

16. Clutch device according to claim 14, in which the wall portion defining the pressure chamber is an outer plate carrier, of the clutch arrangement, said clutch arrangement being a plate clutch arrangement.

17. Multiple-clutch device, for installation in a drivetrain of a motor vehicle between a drive unit and a transmission, the clutch device comprising a first clutch arrangement associated with a first transmission input shaft of the transmission, and a second clutch arrangement associated with a second transmission input shaft of the transmission for transmitting torque between the drive unit and the transmission, each of the clutch arrangements having an actuating piston defining an associated pressure chamber for pressure medium actuation of the clutch arrangement in which:

(a) a first radial outer sealing element seals the first clutch arrangement actuating piston associated pressure chamber on at least one of a radial outer side thereof and axially, and which acts between the said first clutch arrangement actuating piston and a wall of the pressure chamber associated therewith, and a second radial outer sealing element seals the second clutch arrangement actuating piston associated pressure chamber on at least one of a radial outer thereof side and axially, and which acts between said second clutch arrangement actuating piston and a wall of the pressure chamber associated therewith, are arranged at different radial distances from an axis of rotation (A) of the clutch device, and (b) a third radial inner sealing element seals the first clutch arrangement actuating piston associated pressure chamber on at least one of a radial inner side thereof and axially, and which acts between the said first clutch arrangement actuating piston and a wall of the pressure chamber associated therewith, and a radial fourth inner sealing element which seals the second clutch arrangement actuating piston associated pressure chamber on at least one of a radial inner side thereof and axially, and which acts between said second clutch arrangement actuating piston and a wall of the pressure chamber associated therewith, are arranged at different radial distances from said axis of rotation (A) of the clutch device, the first and second outer sealing elements and the third and fourth inner sealing elements are so arranged with respect to a section plane co-directional with the axis of rotation (A) of the clutch device, that one angle α between a straight line which intersects, said first and third sealing elements and a line parallel to the axis of rotation (A) of the clutch device, and another angle α between a straight line which intersects said second and fourth sealing elements and a line parallel to the axis of rotation (A) of the clutch device are formed in the disengaged and engaged states of the two clutch arrangements, the angles α being between about 10° to about 70°, the actuating pistons divide the respective associated pressure chambers from an associated pressure compensation chamber which receives a pressure compensation medium, wherein (c) a fifth radial outer sealing element seals the pressure compensation chamber of the first clutch arrangement on the radial outer side and axially and which acts between the actuating piston of said first clutch arrangement, and a wall of the associated pressure compensation chamber, and a sixth radial outer sealing element which seals the pressure compensation chamber of the second clutch arrangement on at least one of the radial outer side and axially and which acts between the actuating piston of said second clutch arrangement and a wall of the associated pressure compensation chamber, said fifth and sixth sealing elements being arranged at different radial distances from said axis of rotation (A) of the clutch device, and wherein (d) a seventh radial inner sealing element seals the pressure compensation chamber of the first clutch arrangement on at least one of the radial inner side and axially and which acts between the actuating piston of said first clutch arrangement and a wall of the associated pressure compensation chamber and an eighth radial inner sealing element seals the pressure compensation chamber of the second clutch arrangement on at least one of the radial inner side and axially and which acts between the actuating piston and of said second clutch arrangement a wall of the pressure compensation chamber, said seventh and eighth sealing elements being arranged at different radial distances from said axis of rotation (A) of the clutch device.

18. The clutch device according to claim 17, in which the angle α is between about 20° to about 50°.

19. The clutch device according to claim 17, in which the angle α is between about 30° to about 40°.

20. Clutch device according to claim 17, in which the fifth and sixth sealing elements and the seventh and eighth sealing elements are so arranged with respect to a section plane co-directional with the axis of rotation (A) of the clutch device that respective straight lines which intersect, respectively, said fifth and seventh sealing elements, and said sixth and eighth sealing elements, encloses about, with an axis of rotation (A) of the clutch device, an angle α of between about 10° to about 70°, in the disengaged and engage state of the two clutch arrangements.

21. Clutch device according to claim 20, in which the first and the fifth sealing element are separate sealing elements which are arranged at an essentially identical radial distance from the axis of rotation (A) of the clutch device, the second and the sixth sealing elements being separate sealing elements which are arranged at an essentially identical radial distance from the axis of rotation (A) of the clutch device, the third and the seventh sealing elements are formed by a sealing element associated with both the pressure chamber and the pressure compensation chamber of the first clutch arrangement, and the fourth and the eighth sealing elements are formed by a sealing element associated with both the pressure chamber and the pressure compensation chamber of the second clutch arrangement.

22. The clutch device according to claim 20, in which the angle α is between about 30° to about 60°.

23. The clutch device according to claim 20, in which the angle α is between about 40° to 50°.

24. Multiple-clutch device, for installation in a drivetrain of a motor vehicle between a drive unit and a transmission, which clutch device comprises a first clutch arrangement associated with a first transmission input shaft of the transmission, and a second clutch arrangement associated with a second transmission input shaft of the transmission for transmitting torque between the drive unit and the transmission, in which at least one of the clutch arrangements has an actuating piston defining a pressure chamber for pressure medium actuation of the said one clutch arrangement, the actuating piston being guided at one of a wall portion defining the pressure chamber and a wall portion defining an associated pressure compensation chamber so as to seal the pressure compensation chamber, wherein a labyrinth seal comprising at least one annular groove in a surface portion of one of the actuating piston and the wall portion, which surface portion extends in an engaging-disengaging direction of the actuating piston, acts between the respective wall portion and the piston.

25. Multiple-clutch device, for installation in a drivetrain of a motor vehicle between a drive unit and a transmission, the clutch device comprising a fist clutch arrangement associated with a first transmission input shaft of the transmission, and a second clutch arrangement associated with a second transmission input shaft of the transmission for transmitting torque between the drive unit and the transmission, each of the clutch arrangements having an actuating piston defining an associated pressure chamber for pressure medium actuation of the clutch arrangement in which:

(a) a first radial outer sealing element seals the first clutch arrangement actuating piston associated pressure chamber on at least one of a radial outer side thereof and axially, and which acts between the said first clutch arrangement actuating piston and a wall of the pressure chamber associated therewith, and a second radial outer sealing element seals the second clutch arrangement actuating piston associated pressure chamber on at least one of a radial outer thereof side and axially, and which acts between said second clutch arrangement actuating piston and a wall of the pressure chamber associated therewith, are arranged at different radial distances from an axis of rotation (A) of the clutch device, and (b) a third radial inner sealing element seals the first clutch arrangement actuating piston associated pressure chamber on at least one of a radial inner side thereof and axially, and which acts between the said first clutch arrangement actuating piston and a wall of the pressure chamber associated therewith, and a radial fourth inner sealing element which seals the second clutch arrangement actuating piston associated pressure chamber on at least one of a radial inner side thereof and axially, and which acts between said second clutch arrangement actuating piston and a wall of the pressure chamber associated therewith, are arranged at different radial distances from said axis of rotation (A) of the clutch device the first and second outer sealing elements and the third and fourth inner sealing elements are so arranged with respect to a section plane co-directional with the axis of rotation (A) of the clutch device, that one angle α between a straight line which intersects, said first and third sealing elements and a line parallel to the axis of rotation (A) of the clutch device, and another angle α between a straight line which intersects said second and fourth sealing elements and a line parallel to the axis of rotation (A) of the clutch device are formed in the disengaged and engaged states of the two clutch arrangements, the angles a being between about 10° to about 70°, the actuating pistons divide the respective associated pressure chambers from an associated pressure compensation chamber which receives a pressure compensation medium, wherein (c) a fifth radial outer sealing element seals the pressure compensation chamber of the first clutch arrangement on the radial outer side and axially and which acts between the actuating piston of said first clutch arrangement, and a wall of the associated pressure compensation chamber, and a sixth radial outer sealing element which seals the pressure compensation chamber of the second clutch arrangement on at least one of the radial outer side and axially and which acts between the actuating piston of said second clutch arrangement and a wall of the associated pressure compensation chamber, said fifth and sixth sealing elements being arranged at different radial distances from said axis of rotation (A) of the clutch device, and wherein (d) a seventh radial inner sealing element seals the pressure compensation chamber of the first clutch arrangement on at least one of the radial inner side and axially and which acts between the actuating piston of said first clutch arrangement and a wall of the associated pressure compensation chamber and an eighth radial inner sealing element seals the pressure compensation chamber of the second clutch arrangement on at least one of the radial inner side and axially and which acts between the actuating piston and of said second clutch arrangement a wall of the pressure compensation chamber, said seventh and eighth sealing elements being arranged at different radial distances from said axis of rotation (A) of the clutch device, the first and the fifth sealing element are separate sealing elements which are arranged at an essentially identical radial distance from the axis of rotation (A) of the clutch device, the second and the sixth sealing elements being separate sealing elements which are arranged at an essentially identical radial distance from the axis of rotation (A) of the clutch device, the third and the seventh sealing elements are formed by a sealing element associated with both the pressure chamber and the pressure compensation chamber of the first clutch arrangement, and the fourth and the eighth sealing elements are formed by a sealing element associated with both the pressure chamber and the pressure compensation chamber of the second clutch arrangement.

* * * * *